Figure 1:
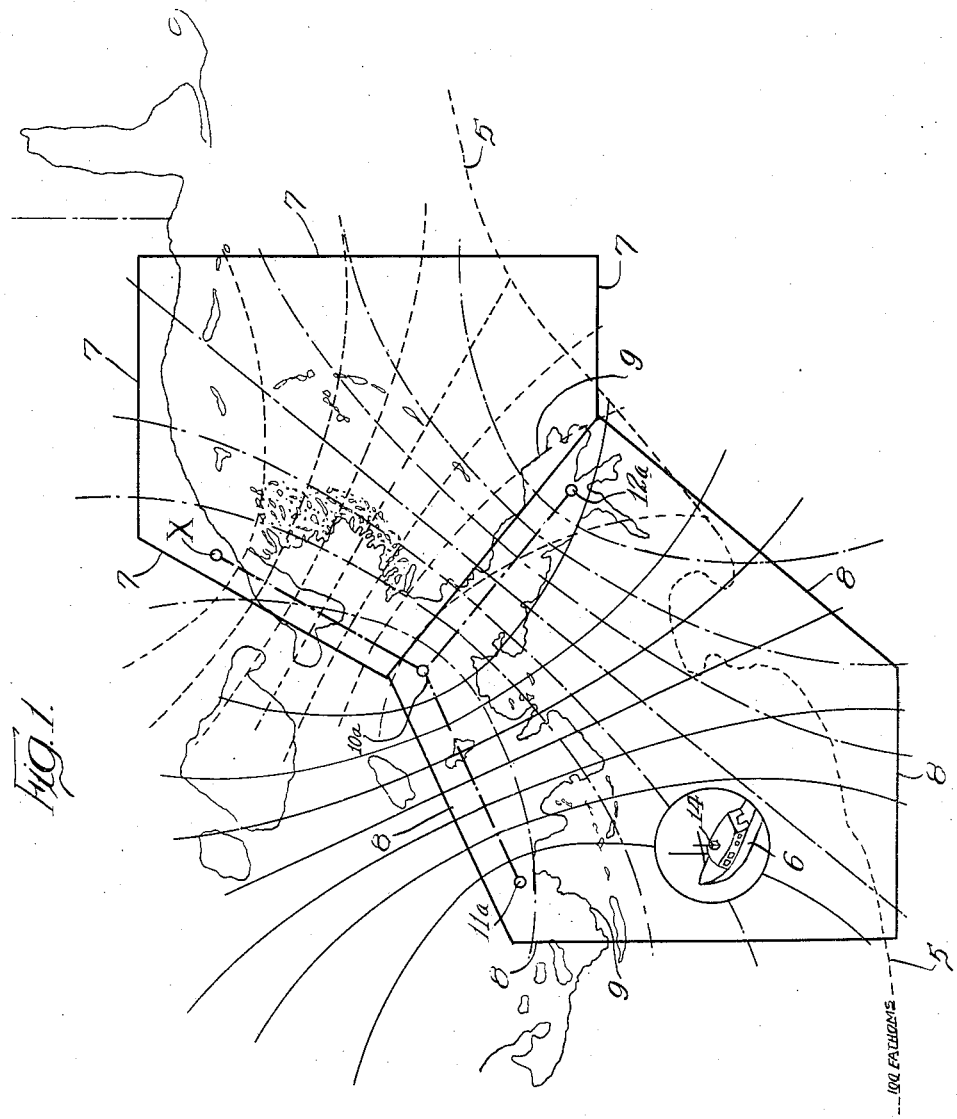

Sept. 9, 1958  J. E. HAWKINS ET AL  2,851,682
RADIO LOCATION SYSTEM
Filed Aug. 21, 1953  8 Sheets-Sheet 1

INVENTORS.
James E. Hawkins
Edward J. Crossland
By:
Mason, Kolehmainen, Rathburn & Wyss
Attys.

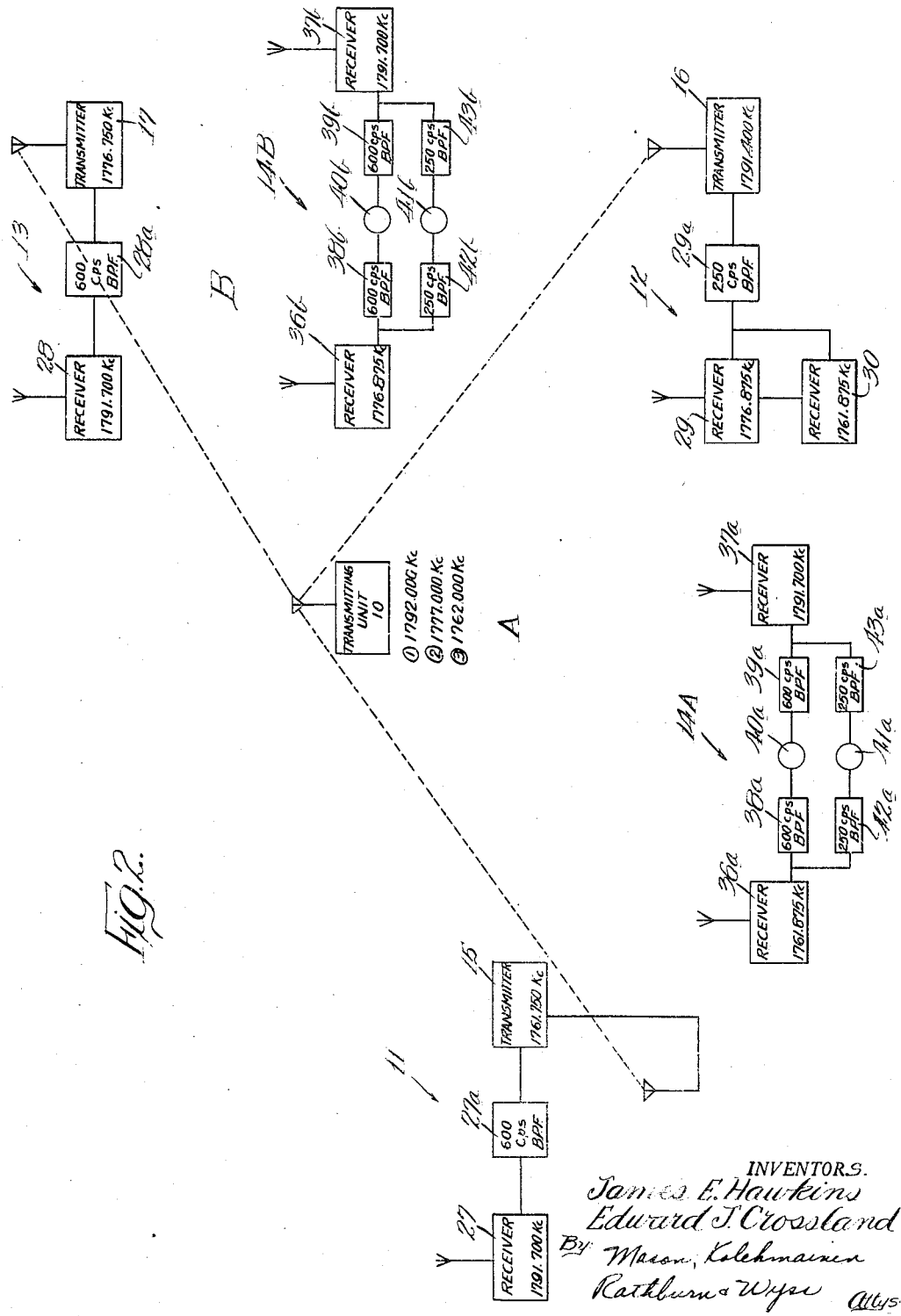

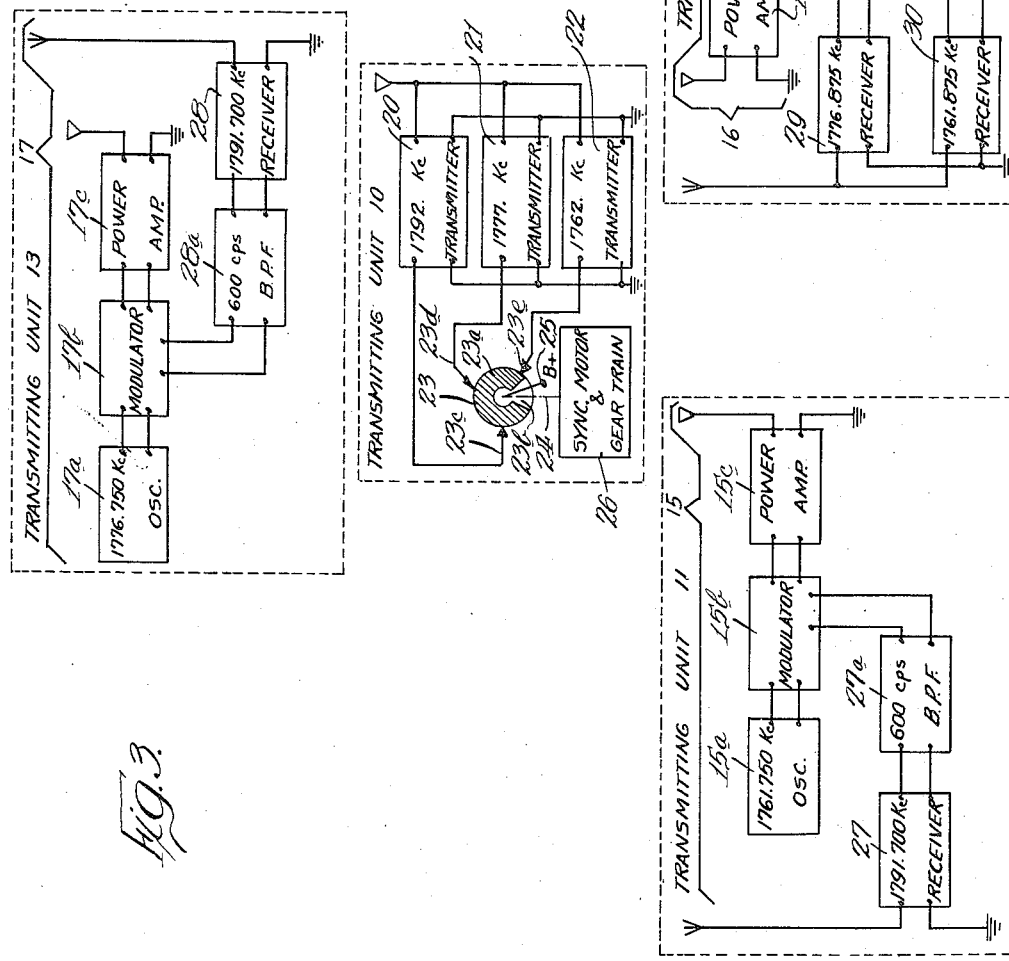

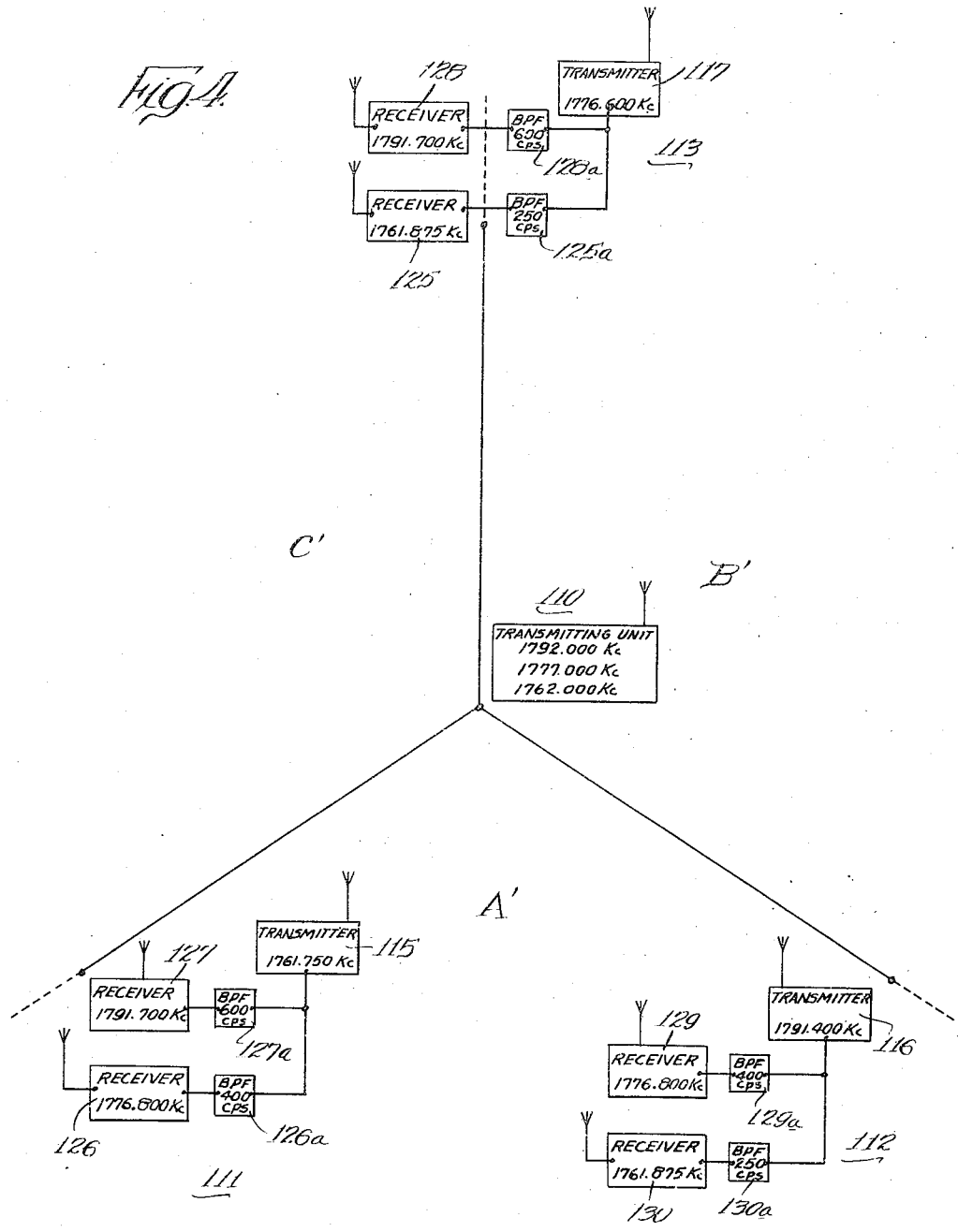

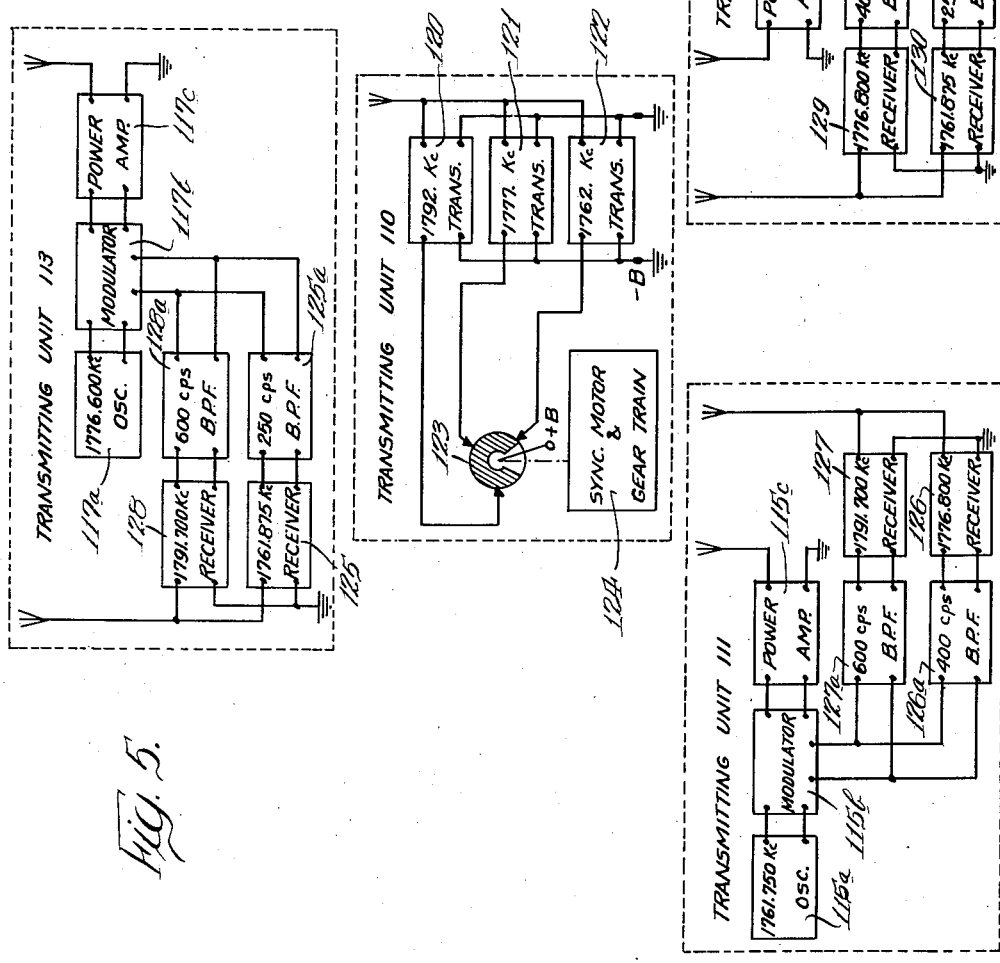

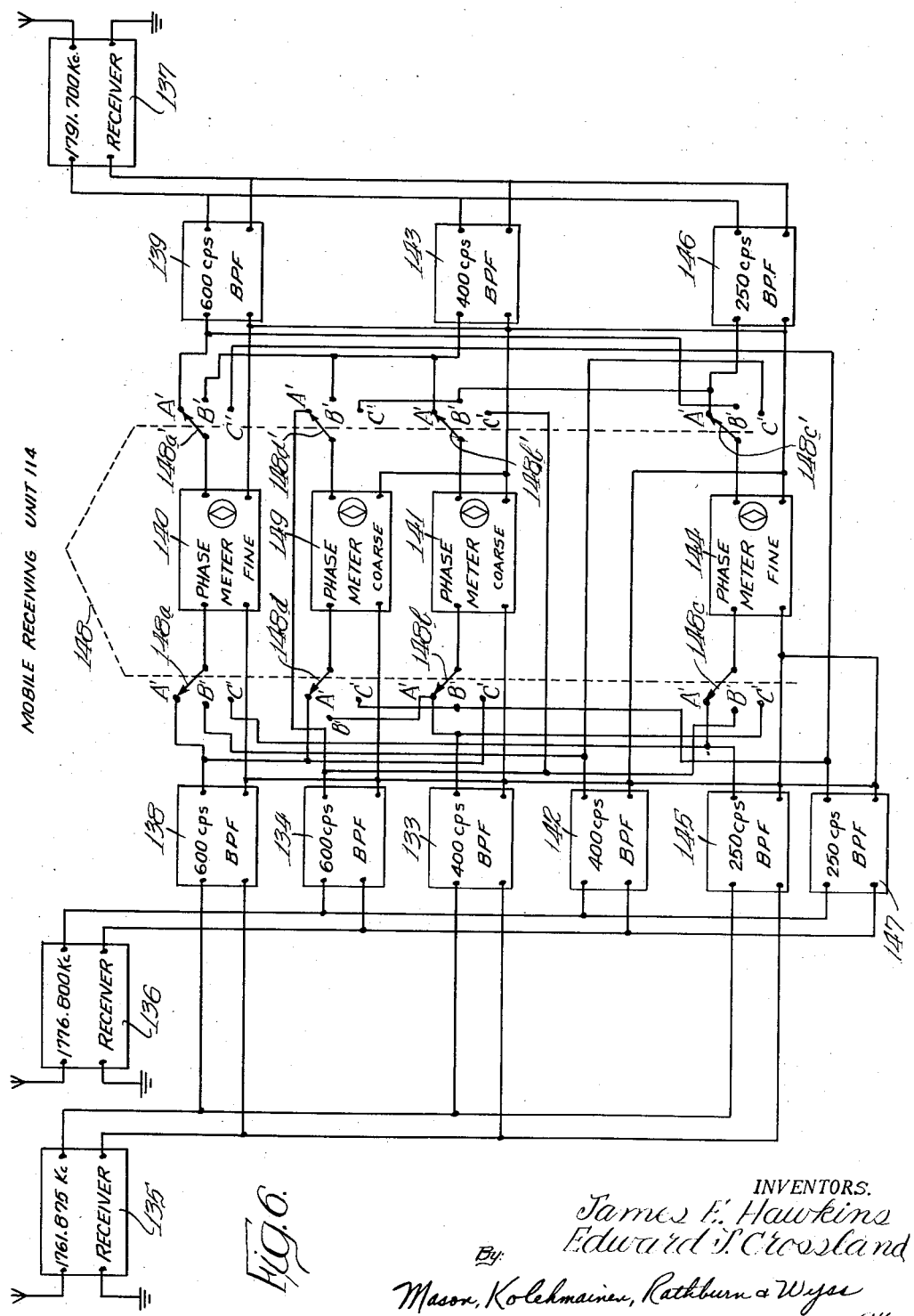

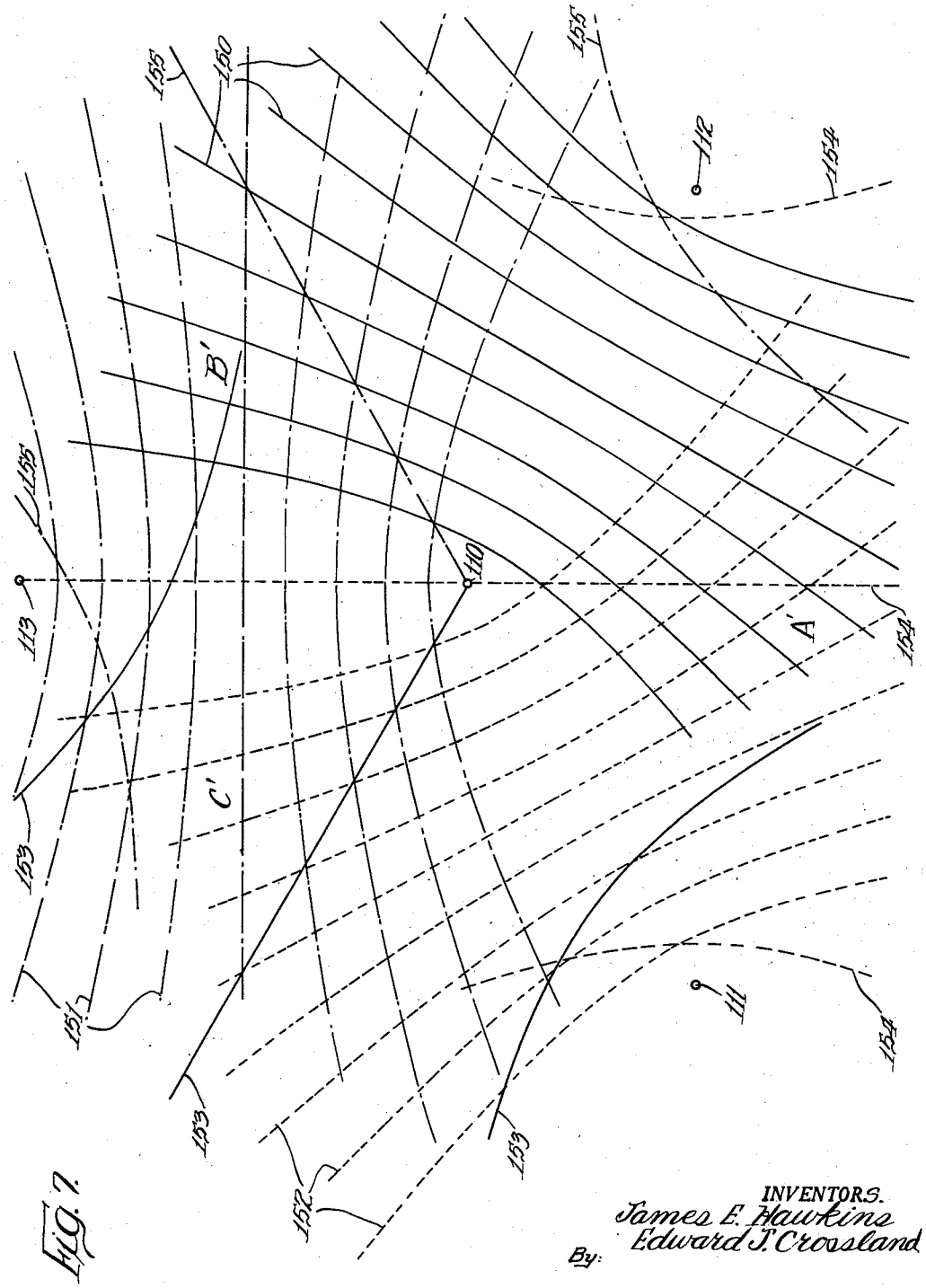

Sept. 9, 1958
J. E. HAWKINS ET AL
2,851,682
RADIO LOCATION SYSTEM
Filed Aug. 21, 1953
8 Sheets-Sheet 8
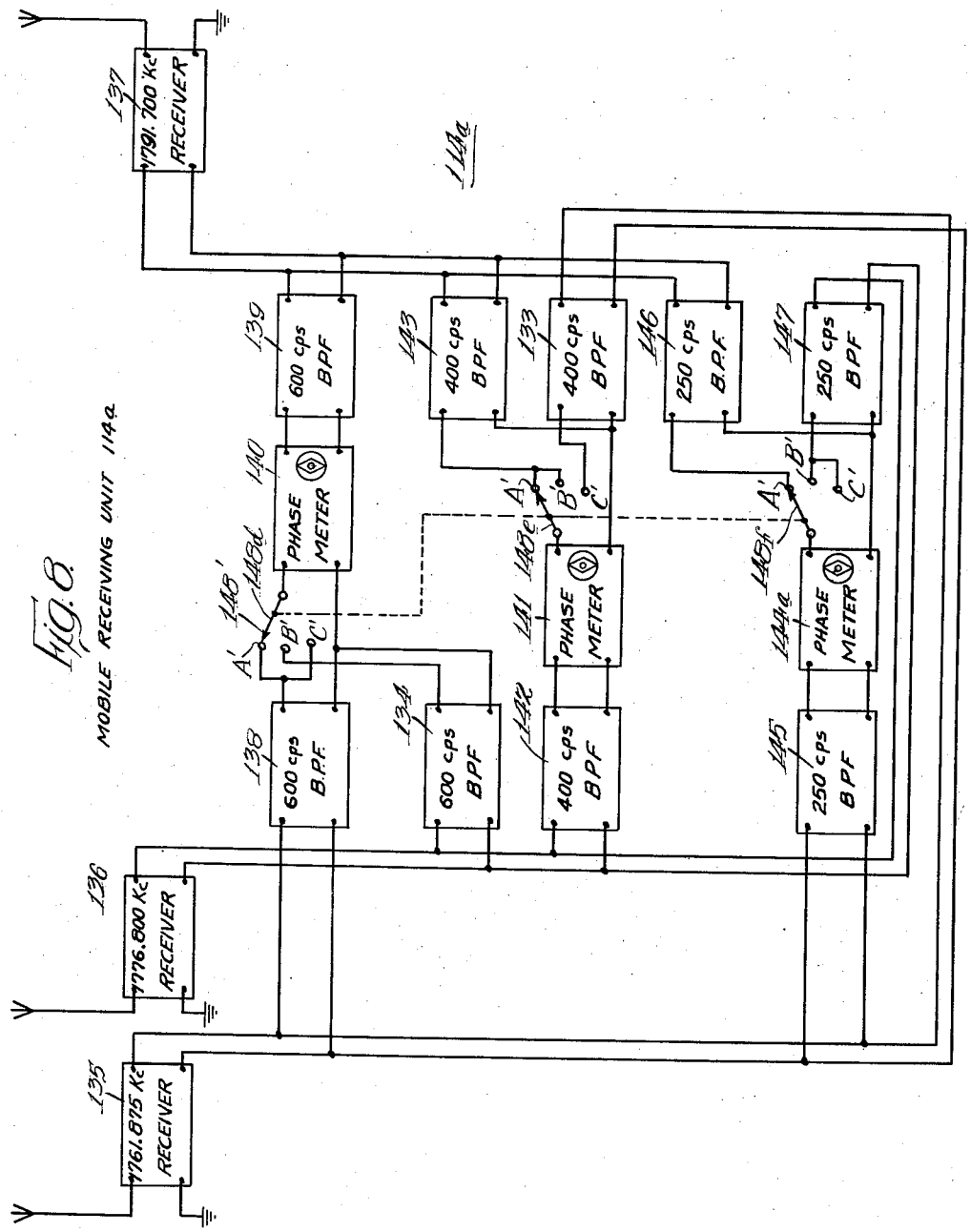
INVENTORS.
James E. Hawkins
Edward J. Crossland
By:
Mason, Kolehmainen, Rathburn & Wyss
Attys.

United States Patent Office 2,851,682
Patented Sept. 9, 1958

2,851,682

RADIO LOCATION SYSTEM

James E. Hawkins, Broken Arrow, and Edward J. Crossland, Tulsa, Okla., assignors to Seismograph Service Corporation, Tulsa, Okla., a corporation of Delaware Application August 21, 1953, Serial No. 375,624

51 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines.

While the described arrangement for obviating the phase synchronization problem is entirely satisfactory, it entails the use of two carrier channels in addition to the three or four channels taken up by the three or four continuously operating survey transmitters, in order to make up a complete system.

An improved arrangement for eliminating the link transmitters without eliminating the functions thereof is disclosed and broadly claimed in Hawkins and Finn Patent No. 2,513,317 wherein a pair of transmitters are alternately operated as link transmitters and as position signal transmitters. Systems of the type referred to are generally set up to cover a particular area of limited size and for this purpose the transmitters are spaced at optimum distances to establish a hyperbolic pattern characterized by closely spaced equiphase lines thereby providing maximum accuracy of phase indications in the survey area. Frequently, however, it becomes desirable to extend the survey in order to explore areas directly adjacent that blanketed by the previously established pattern. Obviously this extension could be effected by a second network of three transmitters located next to the first network and utilizing two additional frequency channels as described in the above-identified Hawkins and Finn patent. However, it is desirable that the channel frequencies be located adjacent the broadcast band or at least below the ultra-high frequency band in order to obviate the problem of line-of-sight transmission, which, of course, necessitates the location of a number of channel frequencies in the most crowded portion of the frequency spectrum, at least insofar as operations in the United States are concerned. Since frequency allocations in this band must be maintained at a minimum, it is not feasible to extend the survey by the addition of an entire set of phase positioning equipment. It is also apparent that the cost of providing three additional transmitting units in order to extend the coverage to these adjacent areas would be relatively large. It is therefore, desirable to extend the survey by integrating an existing set of transmitters and their two frequency channels with as little additional equipment as possible thereby reducing both the installation cost and the number of transmitting frequencies required.

In certain areas it is also desirable to provide a system which affords complete 360° coverage of an area which is geometrically symmetrical with respect to a group of transmitting stations. In this manner a complete survey of an entire region could be effected without relocating or adding to an initial installation of equipment. As indicated above, a practicable system for providing such a survey must take into account the equipment cost and the number of frequency channels which are necessary to achieve the desired coverage.

Another problem encountered in the operation of continuous wave systems is that of eliminating ambiguity from the phase measurements which provide the desired position information. Thus while the two phase measurements identify the position of the receiving station relative to two intersecting pairs of hyperbolic isophase lines, they do not indicate the pairs of lines to which the indications are related. This means that in operating the system the geographic location of the receiving system must be known at the start of movement of the receiving system relative to the transmitting stations and, furthermore, that the successive wavelengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235 filed January 12, 1950, now U. S. Patent No. 2,652,558, entitled, Radio Location System and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem, a considerable number of transmitters and carrier channels are required and a number of narrow band pass filters must be employed to separate the various position indicating and reference signals, which adds to the expense and may cause phase shift difficulties unless the band pass filters are carefully selected and balanced. In United States Patent No. 2,629,091, entitled Radio Location System, issued February 17, 1953, there is disclosed and claimed an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

In one embodiment of the invention disclosed in the latter copending application, narrow band pass filters are entirely eliminated, but a rather large number of different frequency carrier channels are required to provide the necessary position indicating signals and reference signal carriers, and in another embodiment a reduction in the number of frequencies requires the modulation of a plurality of reference signals on common carriers and the utilization of narrow band pass filters at the mobile receiving unit.

In accordance with the present invention, extended coverage of areas adjacent to an existing phase positioning network is achieved by a slight alteration of the existing equipment and the addition of only one transmitting unit utilizing only one additional frequency channel to provide a pair of adjacent hyperbolic grid-like patterns. The signals from the added unit when combined with those of the altered existing equipment provide a completely non-ambiguous system which, while employing a minimum number of frequencies, eliminates the use of narrow band pass filters in the signal circuits and eliminates the necessity for modulation of more than one reference signal at a time on any carrier.

It is therefore, an object of the present invention to provide an improved radio location system for extending the phase position determinations to areas geographically located adjacent to existing phase position determining equipment. Another object of the invention is to provide a radio location system of the character described which effects an extension of a phase position survey by utilizing a minimum amount of additional equipment and a minimum number of frequency channels.

It is another object of the present invention to provide an improved radio location system of the continuous wave type which effects complete coverage of an area under survey and which combines economy of frequencies with a precise position determination.

It is a further object of the present invention to provide a radio position finding system of the character described in which non-ambiguous position indications are obtained.

It is still a further object of the invention to provide a radio position finding system for extending the area of coverage of existing equipment or for providing complete 360° coverage in a given area in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient long range propagation.

It is likewise an object of the present invention to provide improved transmission systems for use in radio location systems of the above-indicated character.

It is also an object of the invention to provide improved receiving equipment for use in radio location systems of the above indicated character.

The invention, both as to its organization and method of operation, together with further objects and advantages thereof, will best be understood by reference to the specification taken in connection with the accompanying drawings in which:

Fig. 1 is a pictorial representation of a water-covered area over which survey operations are to be performed, illustrating one positional arrangement of the transmitters embodied in the system and the grid-like system of isophase lines effectively produced in space by the signals radiated by the transmitters;

Fig. 2 diagrammatically illustrates the component parts of a system embodying the present invention for providing an extension of existing phase positioning apparatus to cover areas which are located in the vicinity of the previously established phase determining system;

Fig. 3 diagrammatically illustrates in somewhat greater detail the arrangement of the equipment at the transmitting units embodied in the system of Fig. 2;

Fig. 4 diagrammatically illustrates a system embodying the present invention for providing phase indicating signals for effecting 360° coverage over an area within the range of the radiated signals from the spaced transmitters;

Fig. 5 diagrammatically illustrates in somewhat greater detail the arrangement of the equipment provided at the transmitter units of the system shown in Fig. 3;

Fig. 6 is a diagrammatic illustration of one form of the mobile receiving equipment that may be employed in the system of Fig. 4;

Fig. 7 illustrates a grid-like pattern of isophase lines of high sensitivity and closely spaced phase coincidences having superimposed thereon a low phase sensitivity pattern having relatively widely spaced phase coincidences which pattern is obtained with a system of the type shown in Fig. 4, and, Fig. 8 is a diagrammatic illustration of another type of receiving equipment which may be employed in the system of Fig. 4.

Referring now to the drawings, and more particularly to Fig. 1, the present invention is illustrated as embodied in a system for providing radio position location information in connection with the conducting of seismic survey operations upon the Gulf of Mexico. Specifically, the segment 9 of the illustrated shore line bounds the southern shores of Louisiana and Mississippi. The dash line 5 disposed below this short line segment represents the dividing line between waters having a depth less than one hundred fathoms and a depth more than one hundred fathoms, it being observed that with present-day techniques, oil well drilling operations are not particularly successful when undertaken in waters having depths much in excess of one hundred fathoms. Thus, for practical purposes it may be assumed that the area within which position information is desired is that disposed between the one hundred fathom line and the shore line segment 9.

It is assumed for purposes of illustration that there is presently existing a three-foci, hyperbolic, continuous wave system for providing position information at a mobile receiving unit 14 which may be carried by a vessel or vehicle 6 operating within the radius of transmission of a plurality of spaced transmitting units 10a, 11a and 12a, such radius of transmission being defined for practical purposes by the area disposed within the solid line 8. These three transmitting units are of the type defined in the above-identified Hawkins and Finn patent and continuously radiate signals for providing phase indications of the position of the mobile receiving unit disposed within this area so as to provide an accurate indication of the position of the unit therein. Let it be assumed that it is desired to provide a system for surveying the area disposed within the solid line 7 in Fig. 1 simultaneously with the survey being conducted in the area defined by the line 8. That is, it is desired to extend the seismic survey to an area which is geographically located adjacent to the area bounded by the line 8 and, at the same time, continue the survey within the area enclosed by that line. As indicated above, it is undesirable to provide a complete new network employing three additional transmitters for establishing a hyperbolic grid within the area 7 due to the aforementioned difficulties with respect to frequency channel allocations and equipment cost. In accordance with the present invention there is provided a system which extends the coverage to those areas in the vicinity of the network already in operation but which effects this extension by employing only one additional frequency channel. Thus, in Fig. 2, the present invention is illustrated as embodied in a system for providing position information at a mobile receiving unit 14A or 14B which may be carried by vessels or vehicles operating within the radius of transmission of four spaced transmitting units 10, 11, 12 and 13. These units are preferably spaced apart approximately equal distances and are so positioned that the line bisecting the points of location of the units 10 and 11 is angularly related to the line bisecting the points of location of the units 10 and 12. Furthermore, the line bisecting the points of location of the units 10 and 13 is angularly related to both of the lines bisecting the locations of the other two pairs of transmitting units. Referring to the geographical representation of Fig. 1, the units 10, 11 and 12 may be physically located so as to replace the units 10a, 11a and 12a of the previously existing system and the unit 13 may be located at the position designated by the reference character X in Fig. 1. As described more fully below, the transmitting units 11, 12 and 13 are equipped continuously to radiate position indicating signals in the form of carrier waves of different frequencies, whereas the transmitting unit 10 is equipped sequentially to radiate three additional position indicating signals in the form of carrier waves of still different frequencies. Specifically, as shown in Fig. 3, the transmitter 15 is embodied in the unit 11 and comprises a carrier wave generator or oscillator 15a and modulator and power amplifier units designated respectively by the numerals 15b and 15c. Similarly, the transmitter 16 embodied in the transmitting unit 12 comprises a carrier wave oscillator or generator 16a and modulator and power amplifier units designated respectively by the numerals 16b and 16c. In like manner, the transmitter 17 embodied in the transmitting unit 13 comprises a carrier wave oscillator or generator 17a and modulator and power amplifier units designated respectively by the numerals 17b and 17c. The transmitting unit 10 comprises three transmitters 20, 21 and 22 for respectively radiating position indicating carrier waves at three different carrier frequencies, together with switching means for successively rendering these three transmitters operative. In the arrangement illustrated, keying of the three transmitters 20, 21 and 22 for alternate operation is accomplished by alternately feeding anode current to the electron discharge tubes of the respective transmitters from the positive terminal 25 of an anode currrent source, not shown, through a commutating ring 23 which is shaft connected by means of a shaft 24 to be driven at a constant speed by a synchronous motor and gear train unit 26. More specifically, the positive terminal 25 of the anode current source is connected to the conductive segment 23b of the commutating ring 23, which segment spans slightly less than one-third of the circumference of the ring. The remainder of the ring is comprised of an insulating segment 23a. At equidistantly spaced points around the circumference of the ring, brushes 23c, 23d and 23e are provided which engage the ring periphery. These brushes are respectively connected to the positive bus conductors of the three transmitters 20, 21 and 22, such that anode current is alternately delivered to the electron discharge tubes of the three transmitters. Since the conductive segment 23b of the ring 23 represents slightly less than one-third of the periphery surface of the ring, it will be understood that a short off-signal period is provided between successive periods during which the transmitters 20, 21 and 22 are sequentially operated, thus preventing simultaneous radiation of waves by any pair of transmitters. The periodicity with which the three transmitters 20, 21 and 22 are successively operated is, of course, dependent upon the speed of rotation of the commutating ring 23. Preferably, this ring is driven at a speed of one revolution per second such that the transmitters 20, 21 and 22 are each rendered operative at one-third second intervals.

As indicated above, the carrier frequencies at which the six transmitters of the four transmitting units 10, 11, 12 and 13 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter 16 in the unit 12, forming the first transmitter pair, may be 1792.000 and 1791.400 kilocycles respectively, such that the difference frequency therebetween is 600 cycles, while the output frequencies of the transmitter 21 and the transmitter 17 of the unit 13, forming the second transmitter pair, may be 1777.000 and 1776.750 kilocycles, respectively, such that the difference frequency therebetween is 250 cycles. The output frequency of the transmitter 22 and the output frequency of the transmitter 15 in the unit 11, forming the third transmitter pair may be 1762.000 and 1761.750, respectively, such that the difference frequency therebetween is 250 cycles. It will be noted that the channels in which the three pairs of carrier frequencies fall are separated in the frequency spectrum by approximately 15 kilocycles, thus facilitating selective reception of these carrier pairs in the manner more fully explained below. The power of the six transmitters is such that the entire area in which position information may be desired aboard the vehicles or vessels carrying the receiving unit 14A or 14B is blanketed with waves radiated from each of the six transmitters and that these waves have a field strength at all points within this area sufficient to permit reliable reception without requiring undue sensitivity of the receiving equipment.

In order to obviate the above-mentioned difficulties attendant upon phase synchronization of the position indicating carrier waves radiated by the six transmitters, while at the same time eliminating the necessity for utilizing additional frequency channels, means are provided in the transmitting units 11, 12 and 13 for successively modulating the waves radiated by the transmitters of these units with reference signals representative of the difference frequencies between the carrier wave pairs. These reference signals may be received at any receiving point, such, for example, as at the mobile receiving units 14A or 14B located within the radius of transmission of the six transmitters. The equipment for this purpose, as provided at the transmitting unit 11, comprises a fixed tuned amplitude modulation receiver 27, center tuned to a frequency of 1791.700 kilocycles and sharply selective to the 1792.000 and 1791.400 kilocycle carrier waves respectively radiated by the transmitters 20 and 16. The selectivity of this receiver is obviously such that the carrier waves radiated by the transmitters 15, 17, 21 and 22 are rejected in the radio frequency section thereof. The beat frequency of 600 cycles between the two carriers accepted by the radio frequency section of the receiver 27 is reproduced in the audio frequency section of this receiver and delivered to the modulator 15b for amplitude modulation upon the carrier output of the transmitter 15 through a narrow band pass filter 27a which is center tuned to a frequency of 600 cycles. Similarly, the transmitting unit 13 is equipped with a fixed tuned amplitude modulation receiver 28 which is also tuned to a carrier frequency of 1791.700 kilocycles and is sharply selective to 1792.000 and 1791.400 kilocycle waves respectively radiated by the transmitters 20 and 16. Here again, the selectivity of the receiver 28 is obviously such that the carrier waves radiated by the transmitters 15, 17, 21 and 22 are rejected in the radio frequency section of the receiver. The beat frequency of 600 cycles between the two carrier waves accepted by the receiver 28 is reproduced in the audio frequency section thereof and modulated upon the carrier wave output of the transmitter 17 through a narrow band pass filter 28a which is center tuned to a frequency of 600 cycles.

The transmitting unit 12 is equipped with a pair of fixed tuned amplitude modulation receivers 29 and 30, the receiver 29 being tuned to a carrier frequency of 1776.875 kilocycles and being sharply selective to the 1777.000 and 1776.750 kilocycle waves respectively radiated by the transmitter 21 and the transmitter 17 of the unit 13. Here again, the selectivity of the receiver 29 is obviously such that the carrier waves radiated by the transmitters 15, 16, 20 and 22 are rejected in the radio frequency section of the receiver. The beat frequency of 250 cycles between the two carrier waves accepted by the receiver 29 is reproduced in the audio frequency section thereof and modulated upon the carrier wave output of the transmitter 16 through a narrow band pass filter 29a which is center tuned to a frequency of 250 cycles. Receiver 30 is center tuned to a carrier frequency of 1761.875 kilocycles and is sharply selective to the 1762.000 and 1761.750 kilocycle waves respectively radiated by the transmitters 22 and 15. It should be noted that the selectivity of the receiver 30 is such that the carrier waves radiated by the transmitters 16, 17, 20 and 21 are rejected in the radio frequency section of the receiver. The beat frequency of 250 cycles between the two carrier waves accepted by the receiver 30 is reproduced in the audio section thereof and modulated upon the carrier wave output of the transmitter 16 through the narrow band pass filter 29a.

In effect the transmitters 20 and 21 and the transmitters of the units 12 and 13 constitute a system for producing a hyperbolic grid to blanket the area designated by the reference character B in Fig. 2 in which the transmitting units 10, 12 and 13 are the foci of the hyperbolic system. Similarly, the transmitters 20 and 22 and the transmitters of the units 11 and 12 effectively produce a grid of hyperbolic lines which cover the area designated by the reference character A in Fig. 2 in which the transmitting units 10, 11 and 12 are positioned at the foci of the hyperbolic pattern. In order to provide a means for receiving the carrier waves from the transmitting units covering the separate areas A and B, it is essential that the radio frequency sections of the receivers be tuned to carrier frequencies corresponding to signals radiated by the transmitters producing the hyperbolic pattern. More specifically, the mobile receiving unit 14A, which may be employed to receive the signals in the area A, comprises a fixed tuned amplitude modulation receiver 36a, a second fixed tuned amplitude modulation receiver 37a, a pair of phase angle meters 40a and 41a, a pair of narrow band pass filters 38a and 39a center tuned to a frequency of 600 cycles, and a pair of narrow band pass filters 42a and 43a center tuned to a frequency of 250 cycles. In particular, the receiver 36a is fixed tuned to a carrier frequency 1761.875 kilocycles and is designed to accept the carrier wave radiated by the transmitter 22 and the carrier wave radiated by the transmitter 15 of the unit 11 both when modulated and unmodulated. Similarly, the receiver 37a is fixed tuned to a carrier frequency of 1791.700 kilocycles and is designed to accept the carrier wave radiated by the transmitter 20 and the carrier wave radiated by the transmitter 16 of the unit 12 both when modulated and unmodulated. The filters 38a and 39a, 42a and 43a, which may be of any standard commercial construction, perform the function of selecting the heterodyne or difference frequency signals and the reference signals alternately developed at the output terminals of the receivers 36a and 37a, respectively, and delivering these signals to the phase meters 40a and 41a, respectively. Preferably these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. If desired, each meter may also be equipped with a revolution counter, gear driven from the rotor element of the meter to count the isophase lines traversed by the mobile receiving unit 14A during movement of the craft carrying this unit.

The mobile receiving unit 14B, which may be employed to provide phase indications of the signals received within the area designated by the reference character B in Fig. 2, comprises a fixed tuned amplitude modulation receiver 36b, a second fixed tuned amplitude modulation receiver 37b, a pair of phase angle meters 40b and 41b, a pair of narrow band pass filters 38b and 39b center tuned to a frequency of 600 cycles and a pair of narrow band pass filters 42b and 43b centered tuned to a frequency of 250 cycles. The receiver 36b is fixed tuned to a carrier frequency of 1776.875 kilocycles and is designed to accept the carrier wave radiated by the transmitter 21 and the carrier wave radiated by the transmitter 17 of the unit 13 both when modulated and unmodulated. Similarly the receiver 37b is fixed tuned to a carrier frequency of 1791.700 kilocycles and is designed to accept the carrier wave radiated by the transmitter 20 and the carrier wave radiated by the transmitter 16 of the unit 12 both when modulated and unmodulated. The filters 38b, 39b, 42b and 43b perform similar functions to the filters of the mobile receiving unit 14a in that they select the heterodyne or difference frequency signals and reference signals alternately developed at the output terminals of the receivers 36b and 37b for delivery to the phase meters 40b and 41b, respectively. The phase meters 40b and 41b are preferably of the same type as the meters 40a and 41a in the mobile receiving unit 14A.

In considering the operation of the above-described position determining system, it will be understood that when the motor and gear train unit 26 is operating to drive the commutating ring 23, anode current is sequentially delivered to the electron discharge tubes of the transmitters 20, 21 and 22, whereby these transmitters are successively rendered operative to radiate carrier waves at frequencies of 1792.000, 1777.000 and 1762.000 kilocycles, respectively. The transmitters of the units 11, 12 and 13, on the other hand, operate continuously. Accordingly, during each interval when the transmitter 20 is in operation, the carrier waves of 1792.000 and 1791.400 kilocycles respectively radiated by the transmitters 20 and 16 are picked up and heterodyned in the radio frequency sections of the receivers 27, 28, 37a and 37b. In the receiver 27, the difference frequency signal of 600 cycles is reproduced in the audio section of the receiver, passed by the filter 27a and modulated upon the carrier wave output of the transmitter 15 in the unit 11 for radiation as a reference signal. This modulated carrier wave is received by the receiver 36a of the mobile receiving unit 14A and the 600 cycle modulation component is reproduced at the output terminals of this receiver. At the same time this modulated carrier wave is rejected by the radio frequency section of the receiver 36b which is tuned to a different carrier frequency. During the period indicated, the transmitters 21 and 22 are not in operation and hence no heterodyne or beat frequency signal is developed by the receiver 36a or by the receivers 29 and 30. The 600 cycle reference signal thus reproduced by the receiver 36a is applied through the band pass filter 38a to the left hand set of input terminals of the phase meter 40a and also to the input terminals of the 250 cycle band pass filter 42a. This filter rejects the applied signal and thus prevents the same from being applied to the left hand set of input terminals of the phase meter 41a.

The 600 cycle beat frequency or heterodyne signal resulting from heterodyning of the carriers radiated by the transmitters 20 and 16 in the radio frequency section of the receiver 37a is reproduced across the output terminals of this receiver and is applied to the input terminals of 600 cycle band pass filter 39a and the input terminals of the 250 cycle band pass filter 43a in parallel. Since the filter 43a prevents a signal from being applied to the right set of input terminals of the phase meter 41a, this phase meter provides no indications during the first interval. The filter 39a, however, passes the signal developed across the output terminals of the receiver 37a and applies the same to the right hand set of terminals of the phase meter 40a. Thus two signal voltages of identical frequency are applied to the two sets of input terminals of the phase meter 40a, with the result that this phase meter functions to measure the phase angle therebetween. This phase angle indication is accurately representative of the position of the receiving unit 14A between two isophase lines of the standing waves produced in area A as a result of the carrier wave radiation by the transmitters 16 and 20.

During the above-described transmitting interval the receiver 28 at the transmitting unit 13 rejects the modulated carrier wave output of the transmitter of the unit 11 but receives the carrier waves of 1792.000 and 1791.400 kilocycles respectively radiated by the transmitter 20 and the transmitter 16 of the unit 12 and these waves are hetrodyned in the radio frequency section of the receiver 28. The difference frequency of 600 cycles is reproduced in the audio section of the receiver, passed by the filter 28a and modulated upon the carrier wave output of the transmitter of the unit 13 for radiation as a reference signal. This modulated carrier wave is rejected by the radio frequency sections of the receivers 36a and 37a of the mobile receiving unit 14A and therefore provides no phase indicating signals for this receiving unit. However, the modulated carrier wave from the transmitter 17 is received by the receiver 36b of the mobile receiving unit 14B and the 600 cycle modulation component is reproduced at the output terminals of the receiver. During the period indicated, the transmitter 21 is inoperative and hence no heterodyne or beat frequency signal is developed by the receiver 36b. The 600 cycle reference signal reproduced at the output of the receiver 36b is applied through the band pass filter 38b to the left set of input terminals of the phase meter 40b and also to the input terminals of the 250 cycle band pass filter 42b. This filter rejects the applied signal and thus prevents the same from being applied to the left set of input terminals of the phase meter 41b.

The 600 cycle beat frequency or heterodyne signal resulting from heterodyning of the carrier waves radiated by the transmitter 20 and the transmitter 16 of the unit 12 in the radio frequency section of the receiver 37b is reproduced across the output terminals of this receiver and is applied to the input terminals of the 600 cycle band pass filter 39b and the input terminals of the 250 cycle band pass filter 43b in parallel. Since the filter 43b prevents a signal from being applied to the right set of input terminals of the phase meter 41b, this meter is not responsive to phase variations during the first interval. The filter 39b, however, passes the signal developed across the output terminals of the receiver 37b and applies the same to the right set of the input terminals of the phase meter 40b. Thus two signal voltages of identical frequency are applied to the two sets of input terminals of the phase meter 40b with the result that this phase meter functions to measure the phase angle therebetween. This phase angle indication is accurately representative of the position of the receiving unit 14B between two isophase lines of the standing waves produced in the area B as a result of the carrier wave radiations by the transmitter 20 and the transmitter 16 of the unit 12.

During this first interval the receivers 29 and 30 of the transmitting unit 12 receive no heterodyne or beat frequency signals since the transmitters 21 and 22 are inoperative. The modulated carrier wave signals radiated by the transmitters 15 and 17 of the units 11 and 13 respectively, are received by the receivers 30 and 29, respectively, but since the modulations of both of these carrier waves are 600 cycle components, these components are rejected by the 250 cycle band pass filter 29a. Therefore during the first transmitting interval, the transmitter of the unit 12 radiates a continuous wave and the transmitters of the units 11 and 13 radiate modulated carrier waves.

At the end of the described transmitting interval, the commutating ring 23 functions to interrupt the circuit for delivering anode current to the tubes of the transmitter 20, with the result that carrier wave radiation from this transmitter is terminated. When radiation of this wave stops, the carrier heterodyning action of the four receivers 37a, 37b, 27 and 28 is likewise terminated to interrupt the reference signal radiation by the transmitters of the units 11 and 13 and to interrupt the heterodyne or difference frequency signal being developed across the output terminals of the receivers 37a and 37b. Thus the phase meters 40a and 40b are rendered ineffective further to change the setting of their indicating elements.

A short time interval after operation of the transmitter 20 is stopped, the commutating ring 23 functions to deliver anode current to the tubes of the transmitter 21 and thus initiates operation of this transmitter. With the transmitter 21 in operation, a 1777.000 kilocycle position indicating carrier wave is radiated thereby which is accepted by the receivers 29 and 36b but is rejected by the receivers 27, 28, 30, 36a, 37a and 37b. Thus during the second interval the mobile receiving unit 14A is not receiving radiations from the transmitting unit 10 and no position signals are available to actuate either of its phase meters. However, the mobile receiving unit 14B is receiving both reference and position signals during this interval. More specifically, the receiver 29 functions to heterodyne the carrier wave radiated by the transmitter 21 with the carrier wave radiated by the transmitter 17 and to reproduce the heterodyne or difference frequency signal of 250 cycles in the audio frequency section thereof. This difference frequency or reference signal is passed by the filter 29a, modulated upon the output carrier wave of the generator 16a in the modulator unit 16b and radiated as a modulation component upon the carrier wave transmitted by the transmitter 16 to the receiver 37b. This receiver accepts the modulated carrier wave and reproduces the modulation component thereof in the usual manner. The reference signal thus developed across the output terminals of the receiver 37b is applied across the input terminals of the 600 cycle band pass filter 39b and the input terminals of the 250 cycle band pass filter 43b in parallel. The filter 43b passes the 250 cycle signal to the right hand set of input terminals of the phase meter 41b whereas the filter 39b functions to reject the applied reference signal voltage and thus prevent the same from being impressed across the right set of input terminals of the phase meter 40b. It will be understood that the receiver 37b is incapable of accepting the carrier wave radiated by the transmitter 17 of the unit 13. Hence, this receiver is prevented from heterodyning the carrier wave radiated by the transmitter 17 with the carrier wave radiated by the transmitter 16 of the unit 12.

The 17770.000 and 1776.750 kilocycle waves respectively radiated by the transmitters 21 and 17 are both accepted by the receiver 36b and heterodyned in the radio frequency section thereof to produce a heterodyne or dfference frequency signal which is produced across the output terminals of the receiver and applied to the input terminals of the 600 cycle band pass filter 38b and the input terminals of the 250 cycle band pass filter 42b in parallel. The heterodyne signal of 250 cycles is rejected by the filter 38b but is passed by the filter 42b and applied to the left hand set of input terminals of the phase meter 41b. Thus reference and heterodyne signals of identical frequencies are respectively applied to the two sets of input terminals of the phase meter 41b. This phase meter functions to measure the phase relationship between the two applied signal voltages and thus provides an indication accurately representative of the position of the receiving unit 14B between two isophase lines of the standing waves produced in the area B by the radiation of position indicating carrier waves from the transmitter 21 and the transmitter at the unit 13.

The 1791.400 kilocycle modulated carrier wave radiated by the transmitter 16 of the unit 12 is received by the receivers 27 and 28 of units 11 and 13, respectively. The 250 cycle reference signal is reproduced at the output terminals of these two receivers and is applied to the input terminals of band pass filters 27a and 28a, which function to reject this reference and prevent its modulation upon the carrier waves radiated by the transmitters 15 and 17, respectively.

At the end of the described transmitting interval, the commutating ring 23 functions to interrupt anode current flow to the tubes of the transmitter 21 and thus arrest operation of this transmitter. When carrier wave radiation by the transmitter 21 is thus terminated, the wave heterodyning action effected in the receivers 29 and 36b is instantly stopped to terminate the radiation of 250 cycle reference signals by the transmitter 16 of the unit 12 and to terminate reproduction of the difference or heterodyne signal at the output terminals of the receiver 36b. Thus the application of signal voltages to the two sets of input terminals of the phase meter 41b is interrupted, with the result that no further change in the setting of the element of this meter can be produced. A short time interval after operation of the transmitter 21 is arrested, the commutating ring 23 functions to complete the circuit for delivering anode current to the tubes of the transmitter 22 and thus initiate operation of this transmitter.

With the transmitter 22 in operation a 1762.000 kilocycle position indicating carrier wave is radiated thereby which is accepted by the receivers 30 and 36a but is rejected by the receivers 27, 28, 29, 36b, 37b, and 37a. Thus during the third interval the mobile receiving unit 14B is receiving no radiations from the transmitting unit 10 and no position signals are available in the area designated by the reference character B. However, the mobile receiving unit 14A is receiving both reference and position signals during this same interval. More specifically, the receiver 30 functions to heterodyne the carrier wave radiated by the transmitter 22 with the carrier wave radiated by the transmitter 15 of the unit 11 and to reproduce the heterodyne or difference frequency signal of 250 cycles in the audio frequency section thereof. This difference frequency or reference signal is passed by the filter 29a, modulated upon the output carrier wave of the generator 16a in the modulator unit 16b and radiated as a modulation component upon the carrier wave transmitted by the transmitter 16 to the receiver 37a. This receiver accepts the modulated carrier wave and reproduces the modulation component thereof in the usual manner. The reference signal thus developed across the output terminals of the receiver 37a is applied across the input terminals of the 600 cycle band pass filter 39a and the input terminals of the 250 cycle band pass filter 43a in parallel. The 250 cycle reference signal is applied through the band pass filter 43a to the right hand set of input terminals of the phase meter 41a whereas the filter 39a functions to reject the applied reference signal voltage and thus prevents the same from being impressed across the right set of input terminals of the phase meter 40a. It will again be understood that the receiver 37a is incapable of accepting the carrier wave radiated by the transmitter 15 of the unit 11 and therefore no heterodyning action occurs at this receiver.

The 1762.000 and 1761.750 kilocycle waves respectively radiated by the transmitter 22 and the transmitter 15 are both accepted by the receiver 36a and heterodyned in the radio frequency section thereof to produce a heterodyne or difference frequency signal which is reproduced across the output terminals of the receiver and applied to the input terminals of the 600 cycle band pass filter 38a and the input terminals of the 250 cycle band pass filter 42a in parallel. The 250 cycle heterodyne signal is rejected by the filter 38a but is passed by the filter 42a and applied to the left set of input terminals of the phase meter 41a. Thus reference and heterodyne signals of identical frequencies are respectively applied to the two sets of input terminals of the phase meter 41a. This phase meter functions to measure the phase relationship between the two applied signal voltages and thus provides an indication accurately representative of the position of the receiving unit 14A between two isophase lines of the standing waves produced in the area A by the radiation of position indicating carrier waves from the transmitter 22 and the transmitter in the unit 11.

Thus during the first one-third of the cycle of operation of the transmitter unit 10 signals are available for providing phase indications in both areas A and B thereby enabling a determination of the phase position of both of the mobile receiving units 14A and 14B with respect to the hyperbolic lines having foci at the transmitting units 10 and 12. During the second one-third portion of the cycle, signals are available only in area B to enable a determination of the phase position of the mobile receiving unit 14B with respect to the hyperbolic lines having foci at the transmitting units 10 and 13, and during the final one-third portion of the cycle no signals are available in the area B but the mobile receiving unit 14A in the area A is capable of receiving phase positioning signals for establishing its position with respect to hyperbolic lines having foci at the transmitting units 10 and 11. It can be seen that the equipment comprising the mobile receiving units 14A and 14B is identical except that the radio frequency sections of the receivers 36a and 36b are tuned to different radio frequencies. Hence by properly tuning the radio frequency section of either the receiver 36a or 36b the mobile receiving equipment 14A and 14B is interchangeable and may be used in either of the areas A and B.

At the end of the third transmitting interval the commutating ring 23 functions to interrupt anode current flow to the tubes of the transmitter 22 thereby arresting operation of this transmitter. When carrier wave radiation by the transmitter 22 is thus terminated, the wave heterodyning action effected in the receivers 30 and 36a is instantly stopped to terminate the radiation of the 250 cycle reference signal by the transmitter 16 and to terminate reproduction of the difference or heterodyne signal at the output terminals of the receiver 36a. Thus the application of signal voltages to the two sets of input terminals of the phase meter 41a is interrupted with the result that no further change in the setting of the element of this meter can be produced. A short time interval after operation of the transmitter 22 is arrested, the commutating ring 23 functions to recomplete the circuit for delivering the anode current to the tubes of the transmitter 20 and thus reinitiate operation of this transmitter with the results described above.

From the foregoing explanation, it will be understood that the transmitters 20 and 21 and 22 in their sequential operation to radiate position indicating carrier waves cooperate with the receivers 27, 28, 29 and 30 of the transmitting units 11, 13 and 12 alternately to render the transmitters of these units operative to radiate position indicating signals and reference signals. More in particular, the position indicating carrier waves sequentially radiated by the transmitters 20, 21 and 22 alternately cause the position indicating carrier waves respectively radiated by the transmitters of the units 11, 13 and 12 to be modulated with reference signals during periods when these transmitters are respectively inactive as position indicating signal radiators. The transmitters of the units 11 and 13 function to radiate reference signals in the form of modulated carrier waves during one-third of each cycle and function as continuous wave generators during two-thirds of each cycle of operation. The transmitter of the unit 12 functions to radiate reference signals during two-thirds of each cycle and to generate position indicating signals during the remaining one-third portion of the cycle. From a consideration of the above explanation, it will be understood that the receivers 36a and 37a alternately function as reference signal detecting receivers and as heterodyning receivers for developing the required heterodyne or difference frequency signals. Specifically, the receiver 36a functions as a heterodyne receiver in respect to the position indicating carrier waves radiated by the transmitter 22 and the transmitter 15 of the unit 11, and during another portion of the cycle functions as a reference signal reproducing receiver in receiving the reference signal modulated carrier radiated by the transmitter 15 of the unit 11. The receiver 37a on the other hand, functions as a heterodyne receiver in respect to the position indicating carrier waves radiated by the transmitter 20 and the transmitter 16 of the unit 12 and during another portion of the cycle functions as a reference signal detecting receiver in receiving the reference signal modulated carrier wave radiated by the transmitter 16 of the unit 12.

Similarly the receivers 36b and 37b alternately function as reference signal detecting receivers and as heterodyning receivers for developing the required heterodyne or difference frequency signals. Specifically the receiver 36b functions as a heterodyne receiver with respect to the position indicating carrier waves radiated by the transmitter 21 and the transmitter 17 of the unit 13, and functions as a reference signal producing receiver in receiving the reference signal modulated carrier radiated by the transmitter 17 of the unit 13. The receiver 37b on the other hand functions as a heterodyne receiver with respect to the position indicating carrier waves radiated by the transmitter 20 and the transmitter 16 of the unit 12 and as a reference signal detecting receiver in receiving the reference signal modulated carrier wave radiated by the transmitter 16.

As will be evident from the above explanation, the phase meter 40a functions to produce a phase angle indication which is representative of the position of the receiving unit 14A between two isophase lines of the standing waves produced in space as a result of carrier wave radiation by the transmitter 20 and the transmitter of the unit 12. With the described arrangement, wherein carrier wave frequencies of 1792.000 and 1791.400 kilocycles are employed, the wave length spacing between the equi-phase lines along a line bisecting the units 10 and 12 is determined by the mean frequency of 1791.700 kilocycles between the two radiated carrier waves. At this particular mean frequency, isophase lines representative of the same phase relationship between the standing waves produced by the transmitter 20 and the transmitter of the unit 12 along the line joining the unit 10 and the unit 12 are spaced apart a distance of about 274 feet. Hence the indication provided by the phase meter 40a identifies the position of the receiving unit 14A within a zone not less than 274 feet in width, i. e., a zone having a minium width equal to one-half the wave length of a wave having a frequency equal to the mean frequency of the position indicating carrier waves radiated by the transmitters 20 and 16.

As previously indicated, the indication provided by the phase meter 40a, standing alone, is ambiguous for the reason that this indication does not identify the point of location of the receiving unit 14A along the zone separating the two adjacent isophase lines of the standing waves produced in space by the transmitters 20 and 16. Identification of this point is obtained through the response of the receiving unit to the position indicating signals radiated by the transmitter 22 and the transmitter 15 of the unit 11. Thus, the phase meter 41a provides an indication of the position of the receiving point, namely, the unit 14a between two isophase lines of the standing waves produced in space by the radiation of position indicating carrier waves from the transmitters 22 and 15. Here again, the wave length spacing of isophase lines along a line bisecting the two units 10 and 11 is determined by the mean frequency of 1761.875 kilocycles between the frequencies of the waves radiated by the transmitter 22 and the transmitter 15. At this particular mean frequency, isophase lines representative of the same phase relationship between the standing waves produced by the two identified transmitters have a minimum spacing of approximately 279 feet, such that the indication provided by the meter 41a identifies the position of the receiving unit 14A within a zone having a 279 foot minimum width. The two indications thus provided by the phase meters 40a and 41a may be readily resolved into distance indications from which the position of the receiving point relative to the three transmitting units 10, 11 and 12 may be determined. With these distances known and the positions of the transmitting units 10, 11 and 12 known the position of the receiving point may obviously be easily determined.

Similarly the phase meter 40b functions to produce a phase angle indication which is representative of the position of the receiving unit 14B between two isophase lines of the standing waves produced in space as a result of carrier wave radiation by the transmitter 20 and the transmitter 16 of the unit 12. As indicated above, the phase meter 40b identifies the position of the receiving unit 14B within a zone not less than 274 feet in width, a distance equal to one-half the wave length of a frequency equal to the mean frequency of the position indicating carrier waves radiated by the transmitters 20 and 16.

The meter 41b provides an indication of the position of the receiving unit 14B between two isophase lines of the standing waves produced in space by the radiation of position indicating carrier waves from the transmitter 21 and the transmitter 17 of the unit 13. Here again, the wave length spacing of isophase lines along a line bisecting the two units 10 and 13 is determined by the mean frequency of 1776.875 kilocycles between the frequencies of the waves radiated by the transmitter 21 and the transmitter 17. At this particular mean frequency isophase lines representative of the same phase relationship between the standing waves produced by the two identified transmitters have a minimum spacing of approximately 277 feet, such that the indication provided by the meter 41b identifies the position of the receiving unit 14B within a zone having a 277 foot minimum width. The two indications thus provided by the phase meters 40b and 41b may obviously be used to locate the position of the mobile receiving unit 14B within the area B. Thus it can be seen that the areas A and B are covered by adjacent imaginary grids of hyperbolic isophase lines of relatively high phase sensitivity, i. e., the hyperbolic isophase lines are spaced closely together. Furthermore, it can be seen that the family of hyperbolic isophase lines having foci at the transmitting units 10 and 12 is common to both areas A and B and that this family of hyperbolas is intersected in the respective areas A and B by families of hyperbolas having their respective foci at the transmitting units 10 and 11 and at the transmitting units 10 and 13.

As previously indicated herein, although the position indications provided by the phase meters identify the position of the receiving unit 14A or 14B relative to adjacent isophase lines with extreme accuracy, they are ambiguous in the sense that they do not identify the particular lanes between these lines in which the signals are collected at the receiving unit. Hence, unless the starting point of the units 14A or 14B is known and the lanes are counted as the station is moved about either of the areas A or B within the area of signal radiation from the four transmitting units 10, 11, 12 and 13, the indications provided by the phase meters cannot be interpreted to identify the position of the mobile receiving unit. The ambiguity of the indications provided by the phase meters 40a and 40b and the meters 41a and 41b may be resolved by equipping each meter with a revolution counter for registering the equiphase lines transversed by the mobile receiving unit. Preferably, however, this ambiguity is resolved by altering the equipment at the receiving units 14A and 14B and at the transmitters 11, 12 and 13 in accordance with the instrumentation of the system shown in Figs. 4 through 7, inclusive, and by utilizing the modulation signals radiated from these transmitting units when acting as reference signal stations to provide low phase sensitivity indications, in a manner subsequently to be described in detail.

The system described in detail in connection with Figs. 2 and 3 provides coverage over adjacent areas extending for a range of approximately 270° around the transmitting unit 10 as a center point. By slight modification of the receiving and transmitting equipment just described, the principles of the present invention may be employed to provide a system as shown in Fig. 4, affording complete 360° coverage about a time sharing transmitting unit at the center of the area to be surveyed. More specifically, the system shown in Fig. 4 comprises four spaced transmitting units 110, 111, 112 and 113 positioned so that the transmitting units 111, 112 and 113 are located approximately at the apexes of an imaginary equilateral triangle and the transmitting unit 110 is positioned near the center of this triangular configuration in order that imaginary lines joining each of the transmitters 111, 112 and 113 with the unit 110 approximate the angle bisectors of the equilateral triangle. The lines joining these transmitting units divide the area to be surveyed into three substantially equal sectors designated by the reference characters A', B', and C' in Fig. 4 and when taken together constitute an entire 360° area in which position information is desired at a mobile receiving unit. The transmitting unit 110 is identical to the transmitting unit 10 described in conjunction with the embodiment of Figs. 1, 2 and 3 and is equipped sequentially to radiate three position indicating signals in the form of carrier waves of different frequencies. The transmitting units 111, 112 and 113 differ slightly from the transmitting units 11, 12 and 13 previously described but perform similar functions to these transmitters in that they are equipped continuously to radiate position indicating signals in the form of carrier waves of frequencies which differ from each other and from the frequencies of the waves radiated by the transmitting unit 110.

Referring now to Fig. 5 for a description of the equipment at each of the transmiting units, it can be seen that the transmitter 115 embodied in the unit 111 comprises a carrier wave generator or oscillator 115a and modulator and power amplifier units designated respectively by the numerals 115b and 115c. Similarly, the transmitter 116 embodied in the transmitting unit 112 comprises a carrier wave oscillator or generator 116a and modulator and power amplifier units designated respectively by the numerals 116b and 116c. In like manner the transmitter 117 embodied in the transmitting unit 113 comprises a carrier wave generator or oscillator 117a and modulator and power amplifier units designated respectively by the numerals 117b and 117c. The transmitting unit 110 comprises three transmitters 120, 121 and 122 for respectively radiating position indicating waves at three different carrier frequencies together with switching means constituted by a commutating ring 123 driven at constant speed by a synchronous motor and gear train 124 for successively rendering these three transmitters operative. The switching means of the transmitter 110 functions in a manner identical to the switching means of the transmitter 10 heretofore described whereby the transmitters 120, 121 and 122 are successively rendered operative at approximately one-third second intervals.

The carrier frequencies at which the five transmitters of the three transmitting units 110, 111 and 112 operate are respectively equal to the frequencies of the carrier waves radiated by the transmitting units 10, 11 and 12 previously described, but the frequency of the carrier radiated by the transmitting unit 113 differs from that radiated by the transmitting unit 13 in order to provide coverage as described hereinafter in the area C' in which no position indicating signals were desired in the embodiment of Figs. 1, 2 and 3. More specifically, the frequencies of operation of the six transmitters embodied in the units 110, 111, 112 and 113 are so paired that the frequencies of each pair are well within a single 10 kilocycle channel. In particular, the output frequencies of the transmitters 120 and 116, forming the first transmitter pair, have a difference frequency therebetween of 600 cycles and the output frequencies of the transmitters 122 and 115 have a difference frequency therebetween of 250 cycles since these transmitters are operating on frequencies identical with those assigned to the transmitters 10, 11 and 12. The output frequencies of the transmitters 121 and 117 may be 1777.000 kilocycles and 1776.600 kilocycles, respectively, so as to form the third pair, whereby the difference frequency therebetween is 400 cycles. It should also be noted that the channels in which the three pairs of carrier frequencies fall are again separated in the frequency spectrum by approximately 15 kilocycles thereby facilitating selective reception of these carrier pairs.

To enable the transmitting units 111, 112 and 113 to function at intervals as reference signal transmitters for eliminating phase synchronization difficulties, means are again provided at each of these transmitting units for alternately modulating the carrier wave output with reference signals representative of the difference frequencies between the carrier wave pairs. The reference signals may be received at a receiving point located within the radius of transmission of each of the transmitters 111, 112 and 113 when acting as reference signal radiators. To provide for intermittent modulation of the carrier wave output at the transmitting unit 111 by different reference signals, there is provided a pair of fixed tuned amplitude modulation receivers 126 and 127, center tuned to different carrier frequencies. The receiver 127 is center tuned to a frequency of 1791.700 kilocycles and is selective to the 1792.000 and 1791.400 kilocycle carrier waves respectively radiated by the transmitters 120 and 116. The selectivity of this receiver is obviously such that the carrier waves radiated by the transmitters 115, 117, 121 and 122 are rejected. The beat frequency of 600 cycles between the two carriers accepted by the receiver 127 is reproduced and delivered to the modulator 115b, Fig. 5, for amplitude modulation upon the carrier wave generated by the transmitter 115 through a narrow band pass filter 127a which is center tuned to a frequency of 600 cycles, thereby providing a first reference signal for reception at mobile receiving units located within the areas A' and C'

To provide a second reference signal of different frequency to mobile receiving units located within the same area the receiver 126 is center tuned to a frequency of 1776.800 kilocycles and is selective only to the 1777.000 and 1776.600 kilocycle carrier waves respectively radiated by the transmitter 121 and the transmitter 117 of the unit 113. The beat frequency of 400 cycles between the two carriers accepted by the receiver 126 is again delivered to the modulator 115b for amplitude modulation upon the carrier output of the transmitter 115 through a narrow band pass filter 126a which is center tuned to a frequency of 400 cycles. It should be understood that transmitters 120 and 121 are operated during different intervals and that, therefore, only one of the reference signals will be modulated on the carrier wave radiated by the unit 111 during any one interval.

The transmitting unit 112 is similarly equipped with a pair of fixed tuned amplitude modulation receivers 129 and 130 center tuned to frequencies of 1776.800 and 1761.875 kilocycles, respectively. The receiver 129 is selective to the carrier waves generated by the transmitters 121 and 117 and has sufficient selectivity to reject the waves radiated by all other transmitters. The beat frequency of 400 cycles between the two carrier waves accepted by the receiver 129 is reproduced in the usual manner, and applied through a band pass filter 129a to the modulator 116b for amplitude modulation upon the carrier wave output of the transmitter 116. This modulation component provides a reference signal for reception by mobile receiving units located within the areas A' and B'. To provide a reference signal of different frequency for reception at mobile receiving units within these areas, the receiver 130 is center tuned to a frequency of 1761.875 kilocycles and selective to the carrier wave outputs of the transmitters 122 and 115, the carrier waves radiated by all of the other transmitters being rejected by this receiver. The beat frequency of 250 cycles between the two carrier waves thus accepted by the receiver 130 is passed through a band pass filter 130a to the modulator 116a for amplitude modulation upon the carrier wave output of the transmitter 116. It should again be noted that the sequential operation of the transmitters 120, 121, and 122 prevents the application of more than one modulation component upon the carrier wave output of the transmitter 116 of the unit 112 during any one interval.

To provide a pair of reference signals of different frequencies for radiation to the areas B' and C' the transmitting unit 113 comprises two fixed tuned amplitude modulation receivers 125 and 128 center tuned to frequencies of 1761.875 and 1791.700 kilocycles, respectively. The receiver 125 is selective to the carrier waves radiated by the transmitter 122 and the transmitter 15 of the unit 111 and is sufficiently selective to reject the waves radiated by each of the other transmitters. The beat frequency of 250 cycles between the two carrier waves accepted by the receiver 125 is reproduced, passed through a band pass filter 125a and delivered to the modulator 117b for amplitude modulation upon the carrier wave radiated by the transmitter 117 of the unit 113, thereby providing a reference signal for transmission to the areas B' and C'. The receiver 128 is selective to the carrier waves generated by the transmitter 120 and the transmitter 116 of the unit 112 and rejects the carrier waves generated by each of the other transmitters. The beat frequency of 600 cycles between the two carrier waves accepted by the receiver 128 is delivered to the modulator 117b for amplitude modulation as a reference signal upon the carrier wave output of the transmitting unit 113 through a band pass filter 128a.

Referring now to Fig. 6 for a description of the equipment constituting the mobile receiving unit 114, it is pointed out that this equipment comprises a plurality of fixed tuned amplitude modulation receivers 135, 136, and 137, a set of three narrow band pass filters 134, 138 and 139 center tuned to a frequency of 600 cycles, a set of three narrow band pass filters 133, 142 and 143 center tuned to a frequency of 400 cycles, a set of three narrow band pass filters 145, 146, 147 center tuned to a frequency of 250 cycles, a plurality of phase angle meters 140, 141, 144 and 149, and a three-position area selector switch 148. The receiver 135 is fixed tuned to a center frequency of 1761.875 and is designed to accept the carrier wave radiated by the transmitter 122 and the carrier wave radiated by the transmitter 115 of the unit 111 both when modulated and unmodulated. The receiver 136 is fixed tuned to a center frequency of 1776.800 kilocycles and is selective to the carrier wave radiated by the transmitter 121 and the carrier wave generated by the transmitter 117 of the unit 113, both when modulated and unmodulated. The receiver 137 is center tuned to a frequency of 1791.700 kilocycles and is selective to receive only the carrier wave generated by the transmitter 120 and the carrier wave radiated by the transmitter 116 of the unit 112, both when modulated and unmodulated. As described in detail in the description of the equipment embodied in the receiving units 14A and 14B, the band pass filters perform the functions of selecting the reference signals and the heterodyne or difference frequency signals successively developed at the output terminals of the receivers 135, 136 and 137 during the separate intervals of radiation of the transmitters 120, 121 and 122 and of delivering these signals to the phase meters 140, 141, 144 and 149.

In effect the transmitter 120 and the transmitter 116 constitute a system for producing a family of hyperbolic isophase lines having foci at the transmitting units 110 and 112 which blanket the areas A' and B' with position indicating signals during the interval when the transmitter 120 is operative. Similarly, the transmitter 121 and the transmitter 117 provide a hyperbolic pattern of isophase lines having foci at the transmitting units 110 and 113 and extending over the areas B' and C'. Similarly, the transmitter 122 and the transmitter 115 provide means for producing a hyperbolic pattern having foci at the transmitting units 110 and 111 and covering the areas A' and C'. To enable the selective reception of the position indicating signals by the mobile receiving unit 114 in all three of the areas A', B' and C', an area selector switch 148 is connected to the input terminals of each of the phase meters 140, 141, 144, and 149. The switch 148 is a ganged eight-section, three-position switch for selectively connecting the output signals developed by the receivers 135, 136 and 137 to the phase meters through associated band pass filters. More particularly, when the switch 148 is in the position marked "A'," the receiving unit 114 is operative to provide phase indications of both high and low sensitivity in the area A' in a manner which will become evident as the description proceeds. The output of the receiver 135 is applied through the band pass filter 138 and through the first section 148a of the selector switch 148 to the left hand set of terminals of the phase meter 140. At the same time the output of the receiver 137 is applied through the band pass filter 139 and the closed contacts of the second section 148a' of the selector switch 148 to the right hand set of input terminals of the phase meter 140. The output of the receiver 135 is also applied through the band pass filter 138 and through the closed contacts of the third section 148d of the area selector switch to the left hand set of input terminals of the phase meter 149, the right hand set of terminals of this meter receiving excitation from the output of the receiver 136 through the band pass filter 134 and closed contacts of the fourth section 148d' of the selector switch. With the switch 148 in the position indicated above, the phase meter 141 has applied to its left hand set of input terminals the output of the receiver 135 through the band pass filter 133 and the closed contacts of the fifth section 148b of the area selector switch. The output of the receiver 137 passes through the band pass filter 143 and through the closed contacts of the sixth section 148b' of the selector switch and is applied to the right hand set of input terminals of the phase meter 141. Simultaneously therewith, the output of the receiver 137 is applied through the band pass filter 146 and through the closed contacts of the eighth section 148c' of the selector switch to the right hand set of input terminals of the phase meter 144, the left hand set of input terminals of this meter being connected through the closed contacts of the seventh section 148c of the area selector switch and through the band pass filter 145 to the output of the receiver 135. This connection of receivers and filters, as is more fully explained hereinafter, enables the phase meters 140 and 144 to provide indications of the high phase sensitivity signals received by the unit 114 in the area A' while the phase meters 141 and 149 provide indications representative of the low phase sensitivity signals received in this area.

To provide a receiving means producing both high and low phase sensitivity indications in the area B', the selector switch 148 may be moved to the position marked "B'" in which the first section 148a applies the output of the receiver 136 to the left hand set of input terminals of the phase meter 140 through the band pass filter 142, the right hand set of terminals of this meter being connected to the output of the receiver 137 through the closed contacts of section 148a' and through the filter 143. The fifth section 148b of the switch 148 applies the output of the receiver 136 through the band pass filter 147 to the left hand set of input terminals of the phase meter 141, the right hand set of terminals of this meter receiving the signal output of the receiver 137 through filter 146 and through the closed contacts of section 148b' of the area selector switch. Section 148c of the switch applies the output of the receiver 136 to the left hand set of input terminals of the phase meter 144 through the band pass filter 134, and section 148c' applies the output of receiver 137 to the right hand set of terminals of the meter 144 through filter 139. The phase meter 149 which is connected to sections 148d and 148d' of the area selector switch 148 receives the outputs of the receivers 135 and 137 through the band pass filters 133 and 143, respectively. As will subsequently become evident the meters 141 and 149 provide indications representative of the low phase sensitively signals received by the unit 114 in the area B' and the meters 140 and 144 provide indications accurately representative of the high phase sensitivity signals received in this area.

In like manner the mobile receiving unit 114 may be rendered operative to produce high and low phase sensitivity indications in the area C' by selective movement of the switch 148 to the position marked C' in which event the output of the receiver 136 is applied to the right hand set of input terminals of the phase meter 140 through the band pass filter 147 and the closed contacts of the second section 148a' of the area selector switch. The left hand set of terminals of the meter 140 has applied thereto through filter 145 and through closed contacts of section 148a of the switch the output signals of the receiver 135. The output of the receiver 135 is also applied to the left hand set of input terminals of the phase meter 141 through the band pass filter 138 and the closed contacts of the fifth section 148b of the selector switch. The output of receiver 136 is applied to the right set of terminals of the phase meter 141 through filter 134 and through the closed contacts of section 148b' of the switch 148. The output of the receiver 135 is applied through the band pass filter 133 and the closed contacts of the seventh section 148c of the selector switch to the left hand set of input terminals of the phase meter 144, the right hand terminals of which are excited by the output of the receiver 136 through filter 142 and through the closed contacts of section 148c' of the area selector switch. The phase meter 149 is energized by the outputs of receivers 136 and 137 through the closed contacts of sections 148d and 148d' of the selector switch and through the band pass filters 147 and 146 respectively.

Turning now to the sequence of operation of the above described position determining system, it can be seen that when the mobile receiving unit 114 is operating in the area A', the motor and gear train unit 124 operates to drive the commutating ring 123 and anode current is delivered in sequence to the electron tubes of the transmitters 120, 121 and 122 thereby rendering these transmitters successively operative to radiate carrier waves at the frequencies indicated. The transmitters of the units 111, 112 and 113 operate continuously to radiate carrier waves at the frequencies described above. Accordingly during each interval when the transmitter 120 is in operation, carrier waves of 1792.000 and 1791.400 kilocycles are respectively radiated by the transmitter 120 and 116 and are picked up and heterodyned in the radio frequency sections of the receivers 127, 128 and 137, all other receivers being sufficiently selective to reject these two carrier signals. In the receiver 127 the difference frequency of 600 cycles is passed by the filter 127a and modulated upon the carrier wave output of the transmitter 115 in the unit 111 for radiation as a reference signal. This modulated carrier wave is received by the receiver 135 of the mobile receiving unit 114 and the 600 cycle modulation component is reproduced at the output terminals of this receiver and is passed by the filter 138 through the contacts A' of section 148a of the area selector switch to the left hand set of input terminals of the phase meter 140. The output of the receiver 135 is also applied to the band pass filters 133 and 145 but these filters reject this reference signal.

The 600 cycle beat frequency produced by heterodyning of the carriers radiated by the transmitter 120 and 116 at the receiver 137 is applied to the right set of terminals of the phase meter 140 through the band pass filter 139. This difference frequency is also applied to the band pass filters 143 and 146 but is rejected thereby. Thus two signal voltages of identical frequency are applied to the two sets of input terminals of the phase meter 140 and, therefore, this phase meter functions to measure the phase angle between the applied signals. With the mobile receiving unit 114 in the area A' and the switch 148 in the position indicated, the phase angle indication on the meter 140 is accurately representative of the position of the receiving unit between two isophase lines of the standing waves produced in the area A' as a result of the carrier wave radiation of the transmitter 120 and the transmitter of the unit 112.

During this first transmitting interval, the receiver 128 also receives the carrier waves radiated by the transmitters 120 and 116 and reproduces the difference frequency of 600 cycles for modulation upon the output of the transmitter 117 in the unit 113. The modulated signal from the transmitter 117 is received by the receiver 136 and the reference signal of 600 cycles is applied through the band pass filter 134 and closed contacts of section 148d' of the area selector switch to the right hand set of input terminals of the phase meter 149, the left hand terminals of which are energized by the 600 cycle reference signal output of the receiver 135 through the band pass filter 138 and closed contacts of section 148d of the switch. The phase meter 149, therefore, has applied to its opposite sets of input terminals signals of identical frequency with the result that the meter registers the phase angle difference between these signals. Since the 600 cycle modulation signals impressed on the carrier waves radiated by the transmitters 115 and 117 both result from a heterodyning of the carrier waves radiated by the transmitters 120 and 116 at the units 111 and 113, respectively, the indication on the meter 149 provides a coarse position determination representative of the position of the mobile receiving unit between two adjacent isophase lines effectively produced in the areas A', B' and C' as a result of radiation of 600 cycle modulated carrier waves from both of the transmitters 115 and 117. Due to the common source of the carrier waves heterodyned to produce the phase compared modulation signals and the fact that all of the transmitters are fixed, the two modulation components are effectively phase synchronized and the spacing of the isophase lines along a line interconnecting the units 111 and 113 will be determined by one half wave length of the 600 cycle modulation signal. The units 111 and 113 are, therefore, positioned at the foci of a family of widely spaced hyperbolas effectively produced by the phase synchronized modulation signals appearing on the carrier waves radiated by the transmitters 115 and 117 during the first transmitting interval. At the particular 600 cycle modulation signal indicated above, the equiphase lines are spaced apart on a line interconnecting the units 111 and 113 by approximately 820,000 feet and due to the divergence of the hyperbolas are spaced apart at somewhat greater distances within the area A' under consideration. The indication on the phase meter 149 thus identifies the position of the mobile receiving unit 114 within a zone having an 820,000 foot minimum width and the indication on the meter 140 accurately portrays the location of the unit within this zone. Therefore during the first transmitting interval the only effective signals received at the unit 114 are the reference signals from the transmitter 115 at the unit 111, the reference signals from the transmitter 117 at the unit 113 and the position indicating signals from the transmitters 120 and 116 which are heterodyned at the receiver 137.

At the end of the first transmitting interval the commutating ring 123 interrupts the transmission of signals from the transmitter 120 thereby ceasing the heterodyning action occurring at the receivers 127, 128 and 137 and also terminating the reference signal radiation by the transmitters 115 and 117 of the unit 111 and 113. The phase meters 140 and 149 are thus rendered ineffective to change further the setting of their indicating elements.

A short time interval after operation of the transmitter 120 is stopped, the commutating ring 123 initiates operation of the transmitter 121 by delivering anode current to its electron tubes. When the transmitter 121 is in operation, a 1777.000 kilocycle position indicating wave is radiated thereby which is accepted by the receivers 126, 129 and 136 but is rejected by all of the other receivers. The receiver 129 at the unit 112 heterodynes the carrier wave radiated by the transmitter 121 and the 1776.600 kilocycle carrier wave radiated by the transmitter 117 of the unit 113 and reproduces a 400 cycle difference frequency signal at its output terminals. This heterodyne or beat frequency signal is modulated as a reference signal on the carrier wave output of the transmitter 116 of the unit 112 through the filter 129a. The receiver 126 at the unit 111 also heterodynes the carrier waves radiated by the transmitters 121 and 117 and reproduces a 400 cycle beat frequency signal at its output terminals. This signal is passed through the filter 126a for modulation as a reference signal upon the carrier wave output of the transmitter 115.

Referring now to the action taking place at the receiving unit 114 during the second interval, it is apparent that the receiver 136 heterodynes the carrier waves radiated by the transmitters 121 and 117 and applies the beat frequency or difference signal of 400 cycles through the filter 142 to the contact B' of section 148a and to the contact C' of section 148c' of the area selected switch 148. With the selector switch in the position A' the output of the filter 142 is confronted by an open circuit at both of these sections of the switch 148 and no signal indications are provided to the phase meters. Since the transmitters 120 and 122 are both inoperative during the second transmitting interval, no heterodyning action occurs at the receivers 135 and 137, but both of these receivers are provided with reference signals in the form of amplitude modulated carrier waves. The receiver 135 is excited by the modulated carrier wave radiated by the transmitter 115 of the unit 111 and the 400 cycle modulation component of this signal is reproduced and applied through the band pass filter 133 and through the closed contacts of section 148b of the area selector switch to the phase meter 141. At the same time the receiver 137 reproduces the modulation component of the modulated carrier wave radiated by the transmitter 116 of the unit 112 and passes this 400 cycle signal through the band pass filter 143 and the closed contacts of section 148b' of the switch 148 to the right hand set of input terminals of the phase meter 141. The phase meter 141 is thus energized by reference signal voltages of identical frequencies applied to opposite sets of input terminals with the result that this phase meter functions to measure the phase angle therebetween. Since the 400 cycle reference signal modulated upon the carrier waves generated by the transmitters 115 and 116 emanated from a common source, that is, from a heterodyning of the carrier waves generated by the transmitters 121 and 117 at the receivers 126 and 129, the 400 cycle signals are phase synchronized and the indication on the phase meter 141 is representative of the position of the receiving unit between two isophase lines of the standing waves produced in the area A' as a result of the reference signal radiation by the transmitters of the units 111 and 112. Thus the modulation components of 400 cycles on the transmitters of both of the units 111 and 112 produce a low phase sensitivity hyperbolic pattern covering the area A' in which the hyperbolic isophase lines have foci at the transmitting units 111 and 112 and are characterized by widely spaced phase coincidences. With the described arrangement wherein reference signals of 400 cycles are employed the spacing between the equiphase lines along a line interconnecting the units 111 and 112 is determined as one-half of the wave length of the 400 cycle modulation of approximately 1,230,000 feet. Hence, the indication provided by the phase meter 141 identifies during the second transmitting interval the position of the receiving unit 114 within a zone not less than the width of this one-half wavelength value, thereby providing a coarse position identification for locating the particular high phase sensitivity lane indicated by the phase meter 140 which was energized as above explained during the first transmitting interval.

At the end of the second transmitting interval the commutating ring 123 ceases the transmission of signals from the transmitter 121 thereby terminating the heterodyning action occurring at receivers 126 and 129 and arresting the radiation of reference signals from the transmitters of the units 111 and 112. A short time after the operation of the transmitter 121 is halted, the commutating ring 123 functions to deliver anode current to the tubes of the transmitter 122 thus initiating operation of this transmitter. With the transmitter 122 in operaion, a 1762.000 kilocycle position indicating carrier wave is radiated thereby which is accepted by the receivers 125, 130 and 135 but is rejected by all other receivers. The receiver 130 heterodynes the carrier waves radiated by transmitter 122 and the transmitter 115 of the unit 111 and reproduces a heterodyne or difference frequency signal of 250 cycles which is passed through the filter 130a and is modulated upon the output of the transmitter 116 of the transmitting unit 112 for use as a reference signal. The receiver 125 at the unit 113 likewise heterodynes the carrier waves radiated by the transmitters 122 and 115 and applies the 250 cycle difference frequency signal through filter 125a to be modulated as a reference signal upon the carrier wave output of the transmitter 117.

Turning now to the functioning of the receiving unit 114 during the third transmitting interval, it can be seen that the receiver 136 receives the modulated carrier wave output of the transmitter 117 but the 250 cycle reference signal output of this receiver is rejected by filters 134 and 142, and the output of the filter 147, which passes this reference signal, is confronted by open circuit terminals at the switch sections 148a', 148b and 148d. Therefore, during the third interval the receiver 136 provides no effective signal to the phase meters 140, 141, 144 and 149. However, the receiver 135 functions to heterodyne the carrier waves generated by transmitters 122 and 115 and reproduces a 250 cycle beat frequency signal which is passed through the filter 145 and through the closed contacts of section 148c of the area selector switch to the left hand set of input terminals of the phase meter 144. The receiver 137 is excited by the modulated carrier wave radiated by the transmitter 116 of the unit 112 and reproduces a 250 cycle reference signal which is applied through the band pass filter 146 and through the closed contacts of section 148c' of the selector switch to the right hand set of input terminals of the phase meter 144. Since this meter is energized by signals of identical frequency, the phase relationship between the applied signals is indicated, thereby providing a high phase sensitivity indication accurately representative of the position of the mobile receiving unit 114 between two isophase lines of the standing waves produced in area A' by the radiation of position indicating carrier waves from the transmitter 122 and the transmitter at the unit 111.

From the foregoing explanation it will be understood that when the receiving unit is in the area A' and the switch 148 is in a corresponding position the phase meters 140 and 144 provide high phase sensitivity indications representative of the position of the mobile receiving unit 114 with respect to the transmitting units 110 and 112 and with respect to the transmitting units 110 and 111, and that the phase meters 141 and 149 provide coarse indications of the position of the receiving unit with respect to the transmitting units 111 and 112 and with respect to the units 111 and 113. Thus the positions of the indicating elements of the phase meters 141 and 149 provide a rough indication of the area within which the mobile receiving unit is located and the indications on the meters 140 and 144 accurately depict the exact location of the receiving unit within this rough area.

It is apparent that the sequential operation of the transmitters 120, 121 and 122 in cooperation with the receivers 126, 127, 125, 128, 129 and 130 successively render each of the transmitting units 111, 112 and 113 operative to radiate position indicating signals and to radiate a pair of reference signals of different frequencies. More particularly, the transmitter of the unit 111 sequentially radiates a first reference signal of 600 cycles, a second reference signal of 400 cycles and a position indicating carrier wave. The transmitting unit 112 functions to radiate a position indicating carrier wave, a 400 cycle reference signal and a 250 cycle reference signal. In like manner the transmitting unit 113 functions to radiate a 600 cycle reference signal, a position indicating carrier wave and a 250 cycle reference signal.

From a consideration of the above explanation it will also be understood that with the area selector switch 148 in the A' position the receivers 135 and 137 alternately function as reference signal detecting receivers and as heterodyning receivers for developing the required difference frequencies. Specifically, the receiver 135 functions as a heterodyne receiver with respect to the position indicating carrier waves radiated by the transmitter 122 and the transmitter of the unit 111, functions as reference signal reproducing receiver with respect to the 600 cycle reference signal radiated by the transmitter of the unit 111, and functions as a reference signal receiver for supplying coarse lane identification with respect to the 400 cycle reference signal radiated by the transmitter of the unit 111. While the receiver 136 provides no high phase sensitivity signals in the area A', this receiver serves as a modulation signal reproducing receiver with respect to the 600 cycle modulated carrier wave radiated by the transmitter 117 of the unit 113 thereby providing a coarse lane identification signal. The receiver 137 functions as a heterodyne receiver for the position indicating carrier waves radiated by the transmitter 120 and the transmitter of the unit 112, functions as a reference signal reproducing receiver with respect to the 250 cycle reference signal radiated by the transmitter of the unit 112 and functions as a reference signal reproducing receiver for supplying coarse lane identification signals with respect to the 400 cycle reference signals radiated by the transmitter of the unit 112.

When the mobile receiving unit 114 is operated in the area B' the area selector switch 148 may thrown to the position marked B' in which event the receiver 135 is rendered ineffective to produce high phase sensitivity position indicating signals. This latter receiver, however, provides the phase meter 149 with coarse lane identification signals through the closed contacts of section 148d of the switch 148. The receiver 136 sequentially functions as a heterodyne receiver for providing high phase sensitivity indications on the phase meter 140 with respect to the carrier waves radiated by the transmitter 121 and the transmitter of the unit 113, and functions as a reference signal reproducing receiver with respect to the 600 cycle and 250 cycle reference signals sequentially radiated by the transmitter of the unit 113. The 250 cycle modulated signal is applied to phase meter 141 which also has applied thereto through the filter 146 the 250 cycle modulation component of the modulated carrier wave received by the receiver 137 from the transmitter of the unit 112 during the third transmitting interval. The phase meter 141 provides an indication of the coarse position of the mobile receiving unit 114 with respect to the transmitting units 112 and 113. These transmitting units are, therefore, the foci of a family of hyperbolas spaced apart on a line interconnecting the transmitting units 112 and 113 by a distance corresponding to one half wave length of the 250 cycle reference signal or approximately 1,970,000 feet, thereby providing a means for effecting coarse lane identification. Since the 250 cycle reference signals radiated by the transmitters 112 and 113 originate from a common source, the transmitter 122 and the transmitter 115 of the unit 111, frequency shift or phase shifts are transmitted over dual paths and are thereby cancelled so that the reference signals are phase synchronized. In addition to its function as a reference signal reproducer for the 250 cycle coarse lane identification signal when the switch 148 is in the B' position, the receiver 137 functions as a heterodyning receiver with respect to the carrier waves radiated by the transmitter 120 and the transmitter 116 of the unit 112 and as a reference signal reproducer with respect to the 400 cycle reference signal radiated as a modulation component by the transmitter of the unit 112. The hyperbolic lines resulting from the radiation of 600 cycle modulated carrier waves by the transmitters of the units 111 and 113 blanket the area B' so that the indication on the phase meter 149 provides a second coarse lane identification signal within this area. The carrier waves radiated by transmitter 121 and the transmitter of the unit 113 are heterodyned by receiver 136 to produce a 400 cycle beat frequency signal which is passed to phase meter 140 through band pass filter 142 and through section 148a of the area selector switch. The phase meter 140 compares the phase of the 400 cycle beat frequency signal from filter 142 with the 400 cycle reference signal reproduced by receiver 137 and passed through band pass filter 143 in order to provide a high phase sensitivity indication representative of the location of the mobile receiving unit 114. The phase meter 144 is energized on one side of the 600 cycle reference signal reproduced by receiver 136 and passed through filter 134 and through section 148c of the area selector switch and on the other side by the 600 cycle beat frequency signal produced by receiver 137 and passed through filter 139 and section 148c' of the area selector switch. Thus in the area B' the meters 140 and 144 again provide high phase sensitivity indications for accurately locating the position of the mobile receiving unit 114 within a coarse area identified by the readings on the phase meters 141 and 149.

When the mobile receiving unit 114 is operating in the area C' the switch 148 is placed in the position marked C' and the receiver 137 provides no effective high phase sensitivity signals to the phase meters 140 and 144. However, this receiver provides coarse position signals to the phase meter 149 which again provides an indication representative of the position of the mobile receiving unit between adjacent widely spaced isophase lines produced in the area C' by the radiation of 600 cycle modulated carrier waves by the transmitters of the units 111 and 112. The receiver 135 sequentially functions as a heterodyne receiver with respect to the carrier waves radiated by the transmitter 122 and the transmitter of the unit 111, functions as a reference signal reproducer with respect to the 400 cycle reference signal radiated by the transmitter 111 and functions as a reference signal reproducer to provide coarse lane identification signals with respect to the 600 cycle reference signal radiated by the transmitter of the unit 111. Simultaneously with the radiation of the 600 cycle modulated carrier wave by the unit 111, the unit 113 functions to radiate a 600 cycle modulated carrier wave which is reproduced by the receiver 136 and employed to excite the phase meter 141 through the filter 134. As indicated above, the phase meter 141 provides an indication of the coarse position of the receiving unit relative to adjacent isophase lines produced by modulated carrier wave radiation of the units 111 and 113. The transmitting units 111 and 113 are positioned at the foci of a family of hyperbolas separated on a line bisecting the transmitters by a distance of approximately 820,000 feet, this distance being equal to one-half the wave length of the 600 cycle reference signal.

As previously indicated, the phase meter 149 has applied to its right hand set of input terminals through the filter 146 the 250 cycle modulation component of the carrier wave received at the receiver 137 from the transmitter 116 of the unit 112. The left hand set of terminals of this meter are energized by the 250 cycle modulation signal appearing on the carrier wave radiated by the transmitter 115 of the unit 111, which signal is applied to the meter from the output of the receiver 136 through the band pass filter 147 and through the closed contacts of section 148d of the area selector switch. The phase meter 149 thus indicates the position of the mobile receiving unit 114 between widely spaced equiphase lines produced by the modulation signals impressed upon the carrier waves radiated by the transmitters of the units 111 and 112. With the switch 148 in the C' position the receiver 136, in addition to its function in providing coarse lane identification signals to the meter 149, also functions as a heterodyne receiver for the carrier waves radiated by the transmitter 121 and the transmitter of the unit 113 and as a reference signal reproducer with respect to the 250 cycle reference signal radiated by the transmitter of the unit 113. Hence, in the area C' the phase meters 140 and 144 again provide high phase sensitivity indications to locate accurately the position of the mobile receiving unit 114 within a coarse range identified by the indications on the phase meters 141 and 149.

The interconnection of the area selector switch and the receivers, filters and phase meters in the manner just described permits the operation of each of the phase meters in a cyclic order with respect to the signals from the transmitting units at the foci of the hyperbolic system. The operator of the receiving equipment is thus able to ascertain at a glance the association between the phase meter indications and the base lines interconnecting the transmitters constituting the source of the signals producing the indications.

Referring now to Fig. 7 there is shown the four transmitting units 110, 111, 112 and 113 and the hyperbolic waves of both high and low phase sensitivity blanketing the areas A', B' and C' due to the standing waves produced respectively by the radiated carrier waves and the radiated reference signals from these transmitters. The hyperbolic lines 150 represent the isophase lines effectively produced in the areas A' and B' by the carrier wave radiation from the transmitter 120 and the transmitter of the unit 112. These lines are positioned relatively close together and consequently have a high phase sensitivity with closely spaced phase coincidences. The high phase sensitivity pattern represented by the alternate dot and dash lines designated by the reference character 151 portray the effective equiphase lines produced by the carrier waves radiated by the transmitter 121 and the transmitter of the unit 113 to blanket the areas B' and C'. The dotted lines designated by the reference character 152 are representative of the high phase sensitivity, hyperbolic pattern of the standing waves produced in the areas A' and C' by carrier waves radiated by the transmitter 122 and the transmitter of the unit 111. It can now be seen that all three of the designated areas are covered by a hyperbolic grid thus facilitating an accurate measurement of the position of a mobile receiving unit within any of the areas. The solid lines indicated by the reference character 153 represent the low sensitivity hyperbolic pattern produced as a result of the 600 cycle modulated signal radiations from the transmitters of the units 111 and 113. The widely spaced dotted lines designated by the numeral 154 are representative of the low phase sensitivity, hyperbolic pattern produced as a result of the 400 cycle modulated signal radiations from the transmitters at the units 111 and 112, and the widely spaced dot-dash lines indicated by the reference numeral 155 represent the low sensitivity hyperbolic pattern produced as a result of the 250 cycle modulated signal radiations from the transmitters at the units 112 and 113. It is thus apparent from the description above that each of the areas is provided with both high and low phase sensitivity signals to facilitate an extremely accurate and non-ambiguous determination of the position of the mobile receiving unit 114 at any point in the area within the range of radiation of these four transmitting units.

If desired the system shown in Fig. 4 may be operated without the low phase sensitivity lane identification signals by replacing the receiving unit 114 with a mobile receiving unit 114a of the type shown in Fig. 8. The equipment embodied in the unit 114a is identical to that of the unit 114 except that the eight-section area selection switch 148 of the latter unit has been replaced by a three-section area selector switch 148'. The receiving unit 114a provides high phase sensitivity indications in the same manner as the unit 114, but in place of the low phase sensitivity indications provided by the unit 114 to resolve ambiguity, the mobile receiving unit 114a provides a third high phase sensitivity indication in order to effect a phase position determination obtained by the concurrent intersection of three hyperbolic lines as indicated on the three phase meters. More specifically, when the switch 148' is in the A' position and the mobile receiving unit 114a is rendered operative to provide phase indications in the area A', the phase meter 140 provides an indication which is representative of the position of the receiving unit with respect to the transmitting units 110 and 112 thereby providing an indication of a first hyperbolic line along which the receiving unit is located. During the second interval of operation of the transmitting unit 110, the receiver 136 functions to heterodyne the carrier waves radiated by the transmitter 121 and the transmitter of the unit 113 thereby producing a 400 cycle signal which is passed through the band pass filter 142 to the phase meter 141. The output carrier wave of the transmitter of the unit 112 is modulated by a 400 cycle reference signal which is received by the receiver 137 and the 400 cycle component is applied through the filter 143 and the closed contacts of section 148e of the area selector switch to the right set of terminals of the phase meter 141. The phase meter 141 provides an indication representative of the position of the mobile receiving unit 114a with respect to the transmitting units 110 and 113 thereby indicating a second hyperbolic line along which the mobile receiving unit is located. During the third interval of operation of the transmitting unit 110 the receiver 135 heterodynes the carrier waves radiated by the transmitter 122 and the transmitter of the unit 111 and provides a 250 cycle signal which is applied through the filter 145 to the left set of input terminals of the phase meter 144a. During this interval the modulated carrier wave output of the transmitting unit 112 is received by receiver 137 and the 250 cycle reference signal is applied through the filter 146 and through closed contacts 148f of the area selector switch to the right set of input terminals of phase meter 144a. The meter 144a provides an indication which is representative of the position of the mobile receiving unit 114a with respect to the transmitters of the units 110 and 111 thereby facilitating the determination of a third hyperbolic line along which the mobile receiving unit is located. As indicated above, the indicating arms on each of the phase meters is mechanically connected to a revolution counter which provides an indication of the number of complete revolutions of the arms and thereby registers the number of lanes traversed by the mobile receiving unit. The readings on the phase meters may be transferred to a hyperbolic chart showing the location in the geographical area being surveyed of the hyperbolas having foci at the transmitting units. From an analysis of such a chart it will become apparent that there is only one point within a limited small area where three hyperbolic lines, represented by the indications on the phase meters intersect at a common point. Since the position obtained by a simultaneous reading of the three meters must result in a single point position determination, a knowledge of the particular limited area within which the receiving unit is located will permit the operator to ascertain the correct hyperbolas which the meters are indicating. If one of the counters or lane indicators of the phase meters loses a count due to transmitter failure, interference or other causes without the operator's knowledge, the position indicated would not be described by a concurrent intersection of three lines but would instead be defined by three separate and distinct intersections of any two of the three hyperbolas. An analysis of the situation by the operator will allow him to determine which of the meters has lost a lane count and corrections can be made accordingly until a concurrent intersection of three hyperbolas is again achieved. The number of concurrent intersections which might occur within a given area is a function of the lane width, base line length, the angle between the base lines, and the accuracy of the phase measurement and, consequently, by employing highly accurate phase meters and by positioning the equipment to obtain optimum results it is possible to limit the number of these intersections so that a system relatively free of ambiguity difficulties is provided.

The mobile receiving unit 114a also provides three simultaneous phase indications when the area selector switch 148' is in either the B' or C' positions and therefore complete 360° coverage in which ambiguity problems are minimized is effected in the manner indicated above.

From the above explanation it will be apparent that the present invention affords a satisfactory solution to the problems of extending the radio position determining survey to areas adjacent to existing equipment. A second embodiment of the invention provides a radio position determining system affording full coverage over a 360° area. Furthermore, it is apparent that the systems described provide solutions to these problems by minimizing both the number of channel frequencies and the amount of equipment required to effect the desired results. Moreover, the system has the advantage that well-known and standard components may be employed throughout for the transmitting and receiving equipment. Even more important is the fact that while the system is characterized by the precision accuracy inherent in phase comparison systems of position determination, it also embodies the highly desirable feature of non-ambiguity. It can also be seen that the signals radiated by the transmitting units described may be received and translated at any number of receiving units operating within the area of transmission of the radio position determining system.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. In a position determining system of the hyperbolic continuous wave type having a receiving point, at least three spaced transmitters for radiating position signals, means for sequentially and intermittently modulating the signals radiated by each of said three transmitters with reference signals, and receiving and translating apparatus at said receiving point jointly responsive to said position indicating and reference signals for producing at least two indications respectively representative of the position of said receiving point relative to different ones of said transmitters.

2. In a position determining system having a receiving point, at least three spaced transmitters, a transmitting unit spaced from each of said transmitters and including means for sequentially radiating a plurality of position indicating signals of different frequency, means at least in part responsive to said signals for successively rendering each of said transmitters alternately operative to transmit position indicating and reference signals, and receiving and translating apparatus at said receiving point jointly responsive to said position indicating and reference signals for producing at least two indications respectively representative of the position of said receiving point relative to different ones of said transmitters.

3. In a position determining system having a receiving point, at least three spaced transmitters continuously operative to radiate distinguishable position indicating signals, additional transmitting apparatus spaced from each of said transmitters and including means for radiating other position indicating signals, means at least in part responsive to said last named signals for intermittently and sequentially modulating the signals radiated by each of said transmitters with a reference signal, and receiving and translating apparatus at said receiving point jointly responsive to said position indicating and reference signals for producing at least two indications respectively representative of the position of said receiving point relative to different ones of said transmitters.

4. In a position determining system having a receiving point, at least three spaced transmitters continuously operative to radiate distinguishable position indicating signals, additional transmitting apparatus spaced from each of said transmitters and including means for sequentially radiating at least three other distinguishable position indicating signals, heterodyning receivers respectively associated with said transmitters and each jointly responsive to the position indicating signal radiated by a predetermined one of the other transmitters and to a different one of the signals radiated by said additional transmitting apparatus for intermittently and sequentially modulating the signals radiated by said transmitters with reference signals, and receiving and translating apparatus at said receiving point jointly responsive to said position indicating and reference signals for producing at least two indications respectively representative of the position of said receiving point relative to different ones of said transmitters.

5. A position determining system comprising at least three spaced transmitters for radiating waves of different frequencies to a receiving point, additional transmitting apparatus spaced from said transmitters and including means for sequentially radiating to said receiving point at least three other waves at still different frequencies, means selectively responsive to the waves radiated by said additional transmitting apparatus for sequentially and intermittently modulating the waves radiated by said spaced transmitters with reference signals, and receiving and translating apparatus at said receiving point jointly responsive to said position indicating and reference signals for producing two indications respectively representative of the position of said receiving point relative to different ones of said transmitters.

6. A positioning determining system comprising at least three spaced transmitters for radiating waves of different frequencies to a receiving point, a transmitting unit spaced from said transmitters and including means for sequentially radiating to said receiving point at least three other waves at still different frequencies, each of the waves radiated by said transmitting unit differing from the waves radiated by preselected ones of said transmitters by different predetermined difference frequencies, means successively responsive to the waves radiated by said transmitting unit for sequentially and intermittently modulating the waves radiated by each of said transmitters with reference signals having frequencies related to said different predetermined difference frequencies, and receiving and translating apparatus at said receiving point jointly responsive to said position indicating and reference signals for producing at least two indications respectively representative of the position of said receiving point relative to different ones of said transmitters.

7. In a position determining system comprising at least three spaced transmitters for radiating waves of different frequencies to a receiving point, a transmitting unit spaced from said transmitters and including means for sequentially radiating to said receiving point at least three other waves at still different frequencies, one of the waves radiated by said transmitting unit differing from the wave radiated by a first of said transmitters by a first predetermined difference frequency, a second of the waves radiated by said transmitting unit differing from the wave radiated by a second of said transmitters by a second predetermined difference frequency, and a third of the waves radiated by said transmitting unit differing from the wave radiated by the third of said transmitters by a third predetermined difference frequency, means successively responsive to the waves radiated by said transmitting unit for alternately modulating the wave radiated by said first transmitter with reference signals having first a frequency related to said second predetermined difference frequency and next a frequency related to said third predetermined difference frequency, and means responsive to the waves radiated by said transmitting unit for modulating the wave radiated by said second transmitter with a reference signal having a frequency related to said first difference frequency and for modulating the wave radiated by said third transmitter with a reference signal having a frequency also related to said first difference frequency.

8. In a position indicating system of the type requiring the transmission of signals from both position indicating transmitters which radiate position indicating signals and link transmitters which radiate reference signals, at least three spaced transmitters for radiating position indicating signals, additional transmitting apparatus spaced from each of said transmitters and including means for sequentially radiating three other position indicating signals, and means selectively responsive to different ones of said other position indicating signals for sequentially converting said spaced transmitters into link transmitters.

9. A wave signal transmission system for radiating position indicating signals, comprising at least three spaced transmitters for radiating waves at different frequencies, at least three other transmitters for radiating waves at still different frequencies, means for sequentially rendering said other transmitters operative, and means responsive to the waves radiated by said other transmitters for successively modulating the waves radiated by said first-named transmitters with reference signals.

10. A wave signal transmission system for radiating position indicating signals, comprising a first pair of spaced transmitters for radiating waves at different frequencies, a second pair of spaced transmitters for radiating waves at still other frequencies, a third pair of spaced transmitters for radiating waves at still different frequencies, means for sequentially rendering operative one transmitter of each pair, and means responsive to the waves radiated by said one transmitter of each pair for alternately modulating the waves radiated by the other transmitter of the other pairs with reference signals having frequencies related to the difference frequency between the frequencies of the waves radiated by the transmitters of the pair which includes the operating one of said sequentially operated transmitters.

11. A wave signal transmission system for radiating position indicating waves, comprising at least three spaced transmitters for radiating waves at different frequencies, a transmitting unit spaced from each of said transmitters and including means for sequentially radiating waves of at least three still different frequencies, and means successively responsive to the waves radiated by said transmitting unit for alternately modulating the waves radiated by each of said transmitters with reference signals.

12. A wave signal transmission system comprising four spaced transmitting units for radiating three pairs of waves, all of said waves having different frequencies, one of said units including means for sequentially radiating one wave of each pair, and means responsive to the waves sequentially radiated by said one unit for successively modulating the waves radiated by the other units with reference signals having different frequencies respectively related to the different frequencies between the waves of said three pairs.

13. A wave signal transmission system comprising four spaced transmitting units for radiating three pairs of waves, all of said waves having different frequencies, one of said units including means for sequentially radiating one wave of each pair, and means associated with each of the other units and responsive only to one of the waves radiated by said one unit for intermittently modulating in succession the waves radiated by the other three units with reference signals having frequencies related to the difference frequencies between the frequency of the waves radiated by said one unit and the frequency of the waves radiated by predetermined ones of said other units.

14. A wave signal transmission system comprising four separate transmitting units for radiating three pairs of waves, all of said waves having different frequencies, one of said units including means for sequentially radiating one wave of each pair, receiving means associated with a first of the other three units and selectively responsive only to one of the waves radiated by said one unit for heterodyning said one wave with the wave radiated by a second of said other three units and for modulating the difference frequency signal upon the wave radiated by said first unit, receiving means associated with a third of said other units and responsive only to said one wave for heterodyning said one wave with the wave radiated by said second unit and for modulating the difference frequency signal upon the wave radiated by said third unit, and receiving means associated with the second of said other units and responsive both to the second and third waves radiated by said one unit for first heterodyning said second wave with the wave radiated by said third unit and next heterodyning the third wave radiated by said one unit with the wave radiated by said first unit and for modulating the difference frequency signals upon the wave radiated by the second unit.

15. A wave signal transmission system for radiating position indicating waves, comprising at least three spaced transmitters for radiating waves at different frequencies, a transmitting unit spaced from each of said transmitters and including means for sequentially radiating waves of at least three still different frequencies during three spaced intervals, means for modulating the waves radiated by the first and second of said transmitters by a first reference signal during the first of said intervals, and means for modulating the wave radiated by a third of said transmitters by a second reference signal during the second and third intervals.

16. A wave signal transmission system for radiating position indicating waves, comprising at least three spaced transmitters for radiating waves at different frequencies, a transmitting unit spaced from each of said transmitters and including means for sequentially radiating waves of at least three still different frequencies during three spaced intervals, means associated with the first and second of said transmitters and responsive only to one of the waves radiated by said transmitting unit during the first of said intervals for modulating the waves radiated by the first and second transmitters during the first interval, and means responsive to the second and third waves radiated by said transmitting unit for modulating the wave radiated by the third transmitter during the second and third intervals.

17. A wave signal transmission system for radiating position indicating waves, comprising at least three spaced transmitters for radiating waves at different frequencies, a transmitting unit spaced from each of said transmitters and including means for sequentially radiating waves of at least three still different frequencies during three spaced intervals, receiving means associated with the first and second transmitters responsive only to one of the waves radiated by said transmitting unit for heterodyning said one wave with the wave radiated by a third of said transmitters and for modulating the waves radiated by the first and second transmitters with the difference frequency signal during the first interval, and a pair of receiving means associated with said third transmitter responsive respectively to the second and third waves radiated by said transmitting unit for heterodyning the second wave with the wave radiated by the first transmitter during the second interval, for heterodyning the third wave with the wave radiated by the third transmitter during the third interval and for modulating the difference frequency signals upon the wave radiated by the third transmitter.

18. A wave signal transmission system, comprising four spaced transmitting units for radiating three pairs of waves, all of said waves having different frequencies, one of said units including means for sequentially radiating one wave of each pair, the difference frequency between a first of said pairs of waves and the difference frequency between a second of said pairs being equal and being different from the difference frequency between the third of said pairs, means for alternately modulating the waves radiated by a first and second of said transmitting units with the difference frequency between the third pair of waves, and means for alternately modulating the wave radiated by a third of said transmitting units with the difference frequency between said first or second pair of waves.

19. A wave signal transmission system for radiating position indicating signals to two adjacent areas, comprising a plurality of spaced transmitters for radiating position indicating signals at different frequencies, means for sequentially rendering said transmitters operative in pairs to radiate position indicating signals to both of said areas during a first interval, to radiate position indicating signals to only one of said areas during a second interval, and to radiate position indicating signals only to the other of said areas during a third interval.

20. A wave signal transmission system for radiating position indicating signals to two adjacent areas, comprising at least three spaced transmitters for radiating position indicating signals at different frequencies, a transmitting unit spaced from each of said transmitters and including means for radiating waves of at least three still different frequencies at preselected intervals, means for rendering a first of said transmitters and one of the wave radiating means at said transmitting unit operative during a first interval to radiate position indicating signals to both of said areas, means for rendering a second of said transmitters and a second of the wave radiating means at said transmitting unit operative during a second interval to radiate position indicating signals to only one of sadi areas, and means for rendering a third of said transmitters and a third of the wave radiating means at said transmitting unit operative during a third interval to radiate position indicating signals to the other of said areas.

21. In a position determining system having a receiving point, a plurality of spaced transmitters continuously operative to radiate distinguishable position indicating signals, additional transmitting apparatus spaced from each of said transmitters and including means for sequentially radiating at least three other distinguishable position indicating signals, a pair of heterodyning receivers respectively associated with at least one of said transmitters and each jointly responsive to the position indicating signal radiated by predetermined ones of the others of said transmitters and to different ones of the signals radiated by said additional transmitting apparatus for intermittently modulating the signals radiated by said one transmitter with reference signals of different frequencies, and receiving and translating apparatus at said receiving point jointly responsive to said position indicating and reference signals for producing at least two indications respectively representative of the position of said receiving point relative to different ones of said transmitters.

22. In a position determining system having a receiving point, at least three spaced transmitters continuously operative to radiate distinguishable position indicating signals, additional transmitting apparatus postioned at fixed distances from each of said transmitters and including means for sequentially radiating at least three other distinguishable position indicating signals, a pair of heterodyning receivers respectively associated with each of said transmitters and each jointly responsive to the position indicating signal radiated by a predetermined one of the others of said transmitters and to a different one of the signals radiated by said additional transmitting apparatus for alternately modulating the signals radiated by each of said transmitters with reference signals having different frequencies respectively equaling the difference frequencies of the heterodyned signals and receiving and translating apparatus at said reeciving point jointly responsive to said waves and said reference signals for producing at least two indications respectively representative of the position of said receiving point relative to different ones of said transmitters.

23. A wave signal transmission system for radiating position indicating signals, comprising at least three spaced transmitters for radiating waves at different frequencies, at least three other transmitters for radiating waves at still different frequencies, means for sequentially rendering said other transmitters operative, and means responsive to the waves radiated by said other transmitters for successively modulating the waves radiated by each of said first-named transmitters with a plurality of reference signals having different frequencies.

24. A wave signal transmission system for radiating position indicating signals, comprising a first pair of spaced transmitters for radiating waves at different frequencies, a second pair of spaced transmitters for radiating waves at still other frequencies, a third pair of spaced transmitters for radiating waves at still different frequencies, means for sequentially rendering operative one transmitter of each pair, and means responsive to the waves radiated by said one transmitter of each pair for sequentially modulating the waves radiated by the other transmitter of each pair with a pair of reference signals having different frequencies, each of said frequencies being related to the difference frequency between the frequencies of the waves radiated by the transmitters of the operative pair when said transmitters are sequentially operated.

25. A wave signal transmission system comprising four separate transmitting units for radiating three pairs of waves, all of said waves having different frequencies, one of said units including means for sequentially radiating one wave of each pair, a pair of receiving means associated with each of the other three units and each selectively responsive only to a different one of the waves radiated by said one unit, each of said receiving means heterodyning the one wave to which it is responsive with the wave radiated by one of said other three units and means for modulating the heterodyne difference frequency signal upon the wave radiated by the unit with which it is associated, whereby each of said other units sequentially radiates unmodulated waves, and waves modulated by different reference signals.

26. A wave signal transmission system for radiating position indicating waves, comprising at least three spaced transmitters for radiating waves at different frequencies, a transmitting unit spaced from each of said transmitters and including means for sequentially radiating waves of at least three still different frequencies during three spaced intervals, means for modulating the waves radiated by the first and second of said transmitters by a first reference signal during the first of said intervals, means for modulating the wave radiated by the second and third of said transmitters by a second reference signal during the second interval, and means for modulating the wave radiated by the first and third of said transmitters by a third reference signal during the third interval.

27. A wave signal transmission system for radiating position indicating waves, comprising at least three spaced transmitters for radiating waves at different frequencies, a transmitting unit spaced from each of said transmitters and including means for sequentially radiating waves of at least three still different frequencies during three spaced intervals, means associated with the first and second of said transmitters and responsive only to one of the waves radiated by said transmitting unit during the first of said intervals for modulating with a first reference signal the waves radiated by the first and second transmitters during the first interval, means responsive to the second wave radiated by said transmitting unit for modulating the waves radiated by the second and third transmitters during the second interval, and means responsive to the third wave radiated by said transmitting unit for modulating the waves radiated by the first and third transmitters during the third interval.

28. A wave signal transmission system for radiating position indicating signals to at least three contiguous areas, comprising a plurality of spaced transmitters for radiating position indicating signals at different frequencies, means for sequentially rendering said transmitters operative in pairs to radiate high phase sensitivity position indicating signals to a first and second of said areas during a first interval, to radiate position indicating signals to the second and a third of said areas during a second interval, and to radiate position indicating signals to the first and third of said areas during a third interval.

29. A wave signal transmission system for radiating position indicating signals to at least three contiguous areas, comprising at least three spaced transmitters for radiating position indicating signals at different frequencies, a transmitting unit spaced from each of said transmitters and including means for radiating waves of at least three still different frequencies at preselected intervals, means for rendering a first of said transmitters and one of the wave radiating means at said transmitting unit operative during a first interval to radiate position indicating signals to a first and second of said areas, means for rendering a second of said transmitters and a second of the wave radiating means at said transmitting unit operative during a second interval to radiate position indicating signals to the second and a third of said areas, and means for rendering a third of said transmitters and a third of the wave radiating means at said transmitting unit operative during a third interval to radiate position indicating signals to the first and third of said areas.

30. A wave signal transmission system for radiating position indicating signals to at least three contiguous areas, comprising four spaced transmitting units for radiating three pairs of waves, all of said waves having different frequencies, said transmitting units being positioned so that a line interconnecting a first of said units and a second of said units separates a first and second of said areas, a line interconnecting a third of said units with the first unit separates the second and third of the areas, and a line interconnecting the fourth of said units with the first unit separates the third and first of the areas, means for sequentially operating at least one of said transmitting units to radiate said pairs of waves at spaced intervals whereby a first pair of waves provides position indicating signals for the first and second of said areas, a second pair of waves provides position indicating signals for the second and third of said areas and a third pair of waves provides position indicating signals for the third and first of said areas.

31. A wave signal transmission system comprising at least four spaced transmitters for radiating position indicating signals at different frequencies, means for sequentially rendering said transmitters operative in pairs to radiate high phase sensitivity position indicating signals, and means for simultaneously modulating at least two of said transmitters with phase synchronized reference signals of identical frequency to provide low phase sensitivity signals.

32. A wave signal transmission system for radiating position indicating waves including at least three spaced transmitters for radiating waves at different frequencies, and means for rendering each of said transmitters successively operative to radiate high phase sensitivity position indicating signals during a first interval, to radiate low phase sensitivity position indicating signals during a second interval and to radiate high phase sensitivity reference signals during a third interval.

33. A wave signal transmission system for radiating position indicating signals comprising at least three spaced transmitters for radiating waves at different frequencies, at least three other transmitters for radiating waves at still different frequencies, means for sequentially rendering said other transmitters operative, and means responsive to the waves radiated by said other transmitters for sequentially modulating in pairs the waves radiated by at least two of said first named transmitters with the same reference signal during spaced intervals.

34. A wave signal transmission system for radiating position indicating waves comprising at least three spaced transmitters for radiating waves at different frequencies, a transmitting unit spaced from each of said transmitters and including means for sequentially radiating waves of at least three still different frequencies and means responsive to the waves radiated by said transmitting unit for simultaneously modulating the waves radiated by two of said transmitters with reference signals of the same frequency.

35. A wave signal transmission system comprising four spaced transmitting units for radiating three pairs of waves, all of said waves having different frequencies, one of said units including means for sequentially radiating one wave of each pair and means responsive to the waves radiated by said one unit for simultaneously modulating the waves radiated by two of the other units with the same reference signal having a frequency equal to the different frequency between the waves of the pair which includes the wave being radiated from said one unit.

36. A wave signal transmission system comprising four spaced transmitting units for radiating three pairs of waves, all of said waves having different frequencies, one of said units including means for sequentially radiating one wave of each pair and means associated with two of the other units and responsive only to one of the waves radiated by said one unit for simultaneously modulating the waves radiated by said two units with a reference signal having a frequency related to the difference frequency between the frequency of said one wave and the frequency of the wave radiated by the third of said other units.

37. A wave signal transmission system comprising four spaced transmitting units for radiating three pairs of waves, all of said waves having different frequencies, one of said units including means for sequentially radiating one wave of each pair, receiving means associated with a first and second of the other three units and selectively responsive only to one of the waves radiated by said one unit for heterodyning said one wave with the wave radiated by a third of said other units, and for modulating the difference frequency signal upon the waves radiated by said first and second units, receiving means associated with said second and third units and responsive only to a second of the waves radiated by said one unit for heterodyning said second wave with the wave radiated by said first unit and for modulating the difference frequency signal upon the waves radiated by said second and third units and receiving means associated with said first and third units and responsive only to a third of the waves radiated by said one unit for heterodyning said third wave with the wave radiated by said second unit and for modulating the difference frequency signal upon the waves radiated by said first and third units.

38. Wave signal receiving apparatus for translating received space radiated waves into position indications, comprising three receivers for receiving space radiated waves, means for selectively rendering said receivers sequentially operative in pairs to heterodyne different pairs of position indicating waves and for producing a different beat frequency signal from each of said receivers, to receive and reproduce a pair of reference signals of identical frequency during spaced intervals, and to receive and reproduce reference signals of different frequency during different spaced intervals, and phase measuring means for measuring the phase relationship between one of said beat frequency signals and one of said reference signals of different frequency, for measuring the phase relationship between the other of said beat frequency signals and a second of said reference signals of different frequency and for measuring the phase relationship between the pair of reference signals of identical frequency.

39. Wave signal receiving apparatus for translating received space radiated waves into position indications, comprising three receivers for receiving space radiated waves, means for sequentially rendering each of said receivers operative during different intervals to heterodyne different pairs of position indicating waves and for producing different beat frequency difference signals, means for rendering a first and second of said receivers operative to receive and reproduce a first reference signal during a first interval for rendering a second and third of said receivers operative during a second interval to receive and reproduce a second reference signal, and for rendering the first and third of said receivers operative during a third interval to receive and reproduce a third reference signal, and phase measuring means for measuring the phase relationship between one of said beat frequency signals and one of said first reference signals, for measuring the phase relationship between a second of said beat frequency signals and one of said second reference signals, and for measuring the phase relationship between a third of said beat frequency signals and one of said third reference signals.

40. Wave signal receiving apparatus operative in three contiguous areas for translating received spaced radiated waves into position indications, comprising at least three receivers for receiving space radiated waves, switching means for selectively rendering one pair of said receivers operative in each of said areas and for rendering a third of said receivers ineffective in each of said areas, means for rendering each of said operative pair of receivers effective sequentially to heterodyne position indicating carrier waves and for producing a beat frequency signal, to receive and reproduce a first reference signal during spaced intervals, and to receive and reproduce a different reference signal during other spaced intervals, and phase measuring means for measuring the phase relationship between the beat frequency signal produced by one of said operative pair of receivers and one of said different reference signals produced by the other of said operative pair of receivers, for measuring the phase relationship between one of said different reference signals produced by said one receiver and the heterodyne signal produced by said other receiver, and for measuring the phase relationship between the first reference signals produced by each of said operative pair of receivers.

41. Wave signal receiving apparatus operative in three contiguous operating areas for translating received spaced radiated waves into position indications comprising at least three receivers for receiving space radiated waves switching means for selectively rendering pairs of said receivers operative in each of said areas and for rendering one of said receivers ineffective in each of said areas, means for sequentially rendering each of said operative pair of receivers effective to heterodyne different pairs of position indicating carrier waves during separate intervals and for producing different beat frequency signals, means for rendering a first of said operative pair of receivers effective to receive and reproduce a first reference signal during a first interval and to receive and reproduce a second reference signal during a second interval, means for rendering a second of said operative pair of receivers effective to receive and reproduce a third reference signal during said second interval and to receive and reproduce a fourth reference signal during a third interval, and phase measuring means for measuring the phase relationship between the beat frequency signal produced by the first of said receivers and said fourth reference signal produced by the second receiver of said operative pair, for measuring the phase relationship between the first reference signal produced by said first receiver and the heterodyne signal produced by said second receiver, and for measuring the phase relationship between said second and third reference signals produced by said operative pair of receivers.

42. Wave signal receiving apparatus for translating received space radiated waves into position indications, comprising a first receiver for receiving a first pair of space radiated waves and for heterodyning said waves to produce a first heterodyne signal having a frequency related to a beat frequency between said waves, said first receiver being operative during spaced intervals to receive and reproduce a first reference signal having a frequency representative of a beat frequency between a second pair of radiated waves and modulated upon one of said first pair of radiated waves, said first receiver also being operative during other spaced intervals to receive and reproduce a second reference signal having a frequency representative of a beat frequency between a third pair of radiated waves and modulated upon one of said first pair of radiated waves, a second receiver for receiving and heterodyning said second pair of radiated waves to produce a second heterodyne signal having a frequency equalling the frequency of said first reference signal, said second receiver being operative during spaced intervals to receive and reproduce a third reference signal having a frequency representative of the beat frequency between said first pair of waves and modulated upon one of said second pair of waves, said second receiver also being operative during said other spaced intervals to receive and reproduce a fourth reference signal having a frequency equalling the frequency of said second reference signal, and position indicating means responsive to the heterodyne and reference signals produced by said two receivers for producing three indications respectively representative of the position of said receiving apparatus relative to pairs of displaced sources of said waves.

43. Wave signal receiving apparatus for translating received space radiated waves into position indictions, comprising a first receiver for receiving a first pair of space radiated waves and for heterodyning said waves to produce a first heterodyne signal having a frequency related to a beat frequency between said waves, said first receiver being operative during spaced intervals to receive and reproduce a first reference signal having a frequency representative of a beat frequency between a second pair of radiated waves and modulated upon one of said first pair of radiated waves, said first receiver also being operative during other spaced intervals to receive and reproduce a second reference signal having a frequency representative of a beat frequency between a third pair of radiated waves and modulated upon one of said first pair of radiated waves, a second receiver for receiving and heterodyning said second pair of radiated waves to produce a second heterodyne signal having a frequency equalling the frequency of said first reference signal, said second receiver being operative during spaced intervals to receive and reproduce a third reference signal having a frequency representative of the beat frequency between said first pair of waves and modulated upon one of said second pair of waves, said second receiver also being operative during said other spaced intervals to receive and reproduce a fourth reference signal having a frequency equalling the frequency of said second reference signal, a third receiver for receiving and heterodyning said third pair of radiated waves to produce a third heterodyne signal having a frequency equalling the frequency of said second reference signal, said third receiver being operative during spaced intervals to receive and reproduce a fifth reference signal having a frequency representative of the beat frequency between said first pair of waves and modulated upon one of said third pair of waves, said third receiver also being operative during different spaced intervals to receive and reproduce a sixth reference signal having a frequency representative of the beat frequency between said second pair of waves and modulated upon one of said third pair of waves, and position indicating means responsive to the heterodyne and reference signals produced by said three receivers for producing three indications respectively representative of the position of said receiving apparatus relative to three pairs of displaced sources of said waves.

44. Wave signal receiving apparatus for translating received space radiated waves into position indications, comprising a first receiver for receiving a first pair of space radiated waves and for heterodyning said waves to produce a first heterodyne signal having a frequency related to a beat frequency between said waves, said first receiver being operative during spaced intervals to receive and reproduce a first reference signal having a frequency representative of a beat frequency between a second pair of radiated waves and modulated upon one of said first pair of radiated waves, said first receiver also being operative during other spaced intervals to receive and reproduce a second reference signal having a frequency representative of a beat frequency between a third pair of radiated waves and modulated upon one of said first pair of radiated waves, a second receiver for receiving and heterodyning said second pair of radiated waves to produce a second heterodyne signal having a frequency equalling the frequency of said first reference signal, said second receiver being operative during spaced intervals to receive and reproduce a third reference signal having a frequency representative of the beat frequency between said first pair of waves and modulated upon one of said second pair of waves, said second receiver also being operative during said other spaced intervals to receive and reproduce a fourth reference signal having a frequency equalling the frequency of said second reference signal, and phase measuring means for measuring the phase relationship between said first heterodyne and third reference signals, between said second heterodyne and first reference signals, and between said second and fourth reference signals to provide three indications respectively representative of the position of said receiving apparatus relative to pairs of displaced sources of said waves.

45. Wave signal receiving apparatus for translating received space radiated waves into position indications, comprising a first receiver for receiving a first pair of space radiated waves and for heterodyning said waves to produce a first heterodyne signal having a frequency related to a beat frequency between said waves, said first receiver being operative during spaced intervals to receive and reproduce a first reference signal having a frequency representative of a beat frequency between a second pair of radiated waves and modulated upon one of said first pair of radiated waves, said first receiver also being operative during other spaced intervals to receive and reproduce a second reference signal having a frequency representative of a beat frequency between a third pair of radiated waves and modulated upon one of said first pair of radiated waves, a second receiver for receiving and heterodyning said second pair of radiated waves to produce a second heterodyne signal having a frequency equalling the frequency of said first reference signal, said second receiver being operative during spaced intervals to receive and reproduce a third reference signal having a frequency representative of the beat frequency between said first pair of waves and modulated upon one of said second pair of waves, said second receiver also being operative during said other spaced intervals to receive and reproduce a fourth reference signal having a frequency equalling the frequency of said second reference signal, a first phase measuring device for measuring the phase relationship between said first heterodyne signal and said third reference signal to provide an indication of the position of said receiving apparatus relative to the source of one of the waves, a second phase measuring device for measuring the phase relationship between said second heterodyne signal and said first reference signal to provide an indication of the position of said receiving apparatus relative to the source of a second of said waves, a third phase measuring device for measuring the phase relationship between said second reference signal and said fourth reference signal to provide an indication of the position of said receiving apparatus between the sources of said one wave and said second wave, and means including filters coupled to the output sides of said receivers and tuned respectively to said heterodyne and difference frequency signals for selectively rendering said phase measuring devices operative to measure the phase relationship between said signals.

46. In a transmitting system for use in radio position finding systems of the hyperbolic continuous wave type for providing position indications at a mobile receiving point the combination of a pair of spaced transmitters for radiating position indicating signals, at least one additional transmitter spaced apart from said pair of transmitters for radiating an additional position indicating signal, means associated with each of said pair of transmitters and each responsive at least in part to said additional position indicating signal for simulaneously modulating the position indicating signals radiated by said pair of transmitters with signals of identical frequency.

47. In a transmitting system for use in radio position finding systems of the hyperbolic continuous wave type for providing position indications at a mobile receiving point the combination of a pair of spaced transmitters for radiating position indicating signals, at least one additional transmitter spaced apart from said pair of transmitters for radiating an additional position indicating signal, receiving means associated with a first of said pair of transmitters and at least in part responsive to said additional position indicating signal for producing a first relatively low frequency signal, receiving means associated with the second of said pair of transmitters and also responsive at least in part to said additional position indicating signal for producing a second relatively low frequency signal, and means respectively associated with said pair of transmitters for simultaneously modulating the position indicating signals radiated by said pair of transmitters with reference signals having identical frequencies related to said first and second low frequency signals.

48. In a transmitting system for use in radio position finding systems of the hyperbolic continuous wave type for providing position indications at a mobile receiving point the combination of a first pair of spaced transmitters for radiating position indicating signals, a second pair of spaced transmitters remotely located with respect to said first pair of transmitters for radiating additional position indicating signals, heterodyning means associated with each of said first pair of transmitters each responsive to said additional position indicating signals for producing the difference frequencies therebetween, and means associated with each of said first pair of spaced transmitters for simultaneously modulating the position indicating signals radiated thereby with reference signals of identical frequency related to the difference frequencies produced by said heterodyning means.

49. In a transmitting system for use in radio position finding systems of the hyperbolic continuous wave type for providing position indications at a mobile receiving point, the combination of a first pair of spaced transmitters for radiating position indicating signals, a second pair of spaced transmitters remotely located with respect to said first pair of transmitters for radiating additional position indicating signals, receiving means associated with a first of said first pair of transmitters responsive to said additional position indicating signals for producing a first beat frequency signal, receiving means associated with the second of said first pair of transmitters also responsive to said additional position indicating signals for producing a second beat frequency signal, and means associated with each transmitter of said first pair of transmitters for simultaneously modulating the position indicating signals radiated thereby with reference signals having identical frequencies related to said first and second beat frequency signals.

50. In a radio location system of the hyperbolic type for determining the location of a receiving point, the combination of at least two spaced transmitting units for radiating modulated carrier wave signals, an additional transmitting unit for radiating another carrier wave signal, means at said receiving point responsive at least in part to the carrier components of the waves radiated by said transmitting units for providing a fine position indication representative of the location of said receiving point with respect to said additional transmitting unit and to one of said two transmitting units, and means at the receiving point responsive to the modulation components of said waves for providing simultaneously with the fine position indication a coarse position indication representative of the location of the receiving point relative to said two transmitting units.

51. In a radio location system of the hyperbolic type for determining the location of a receiving point, the combination of at least two spaced transmitting units for radiating distinguishable carrier wave signals, an additional transmitting unit spaced from the two transmitting units for radiating at least one additional carrier wave signal, means at least in part responsive to said additional wave signal for simultaneously modulating the waves radiated by said two transmitting units with modulation signals of the same type and form, means at the receiving point at least in part responsive to the carrier components of the waves radiated by said transmitting units for providing a fine position indication representative of the location of the receiving point with respect to said additional transmitting unit and to one of said two transmitting units, and means at the receiving point responsive solely to the modulation components of said waves for providing simultaneously with the fine position indication a coarse position indication representative of the location of the receiving point relative to said two transmitting units.

References Cited in the file of this patent

UNITED STATES PATENTS

| | | |
|---|---|---|
| 2,513,317 | Hawkins et al. | July 4, 1950 |
| 2,565,485 | Earp et al. | Aug. 28, 1951 |
| 2,629,091 | Hawkins | Feb. 17, 1953 |